(12) United States Patent
Moriya

(10) Patent No.: US 7,897,304 B2
(45) Date of Patent: Mar. 1, 2011

(54) COLOR FILTER, SEMI-TRANSMISSIVE SEMI-REFLECTIVE LIQUID-CRYSTAL DISPLAY DEVICE, METHOD FOR FORMING PHASE DIFFERENCE CONTROL LAYER, AND METHOD FOR MANUFACTURING COLOR FILTER

(75) Inventor: Norihisa Moriya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 976 days.

(21) Appl. No.: 11/526,736

(22) Filed: Sep. 26, 2006

(65) Prior Publication Data
US 2007/0077502 A1 Apr. 5, 2007

(30) Foreign Application Priority Data
Sep. 30, 2005 (JP) .................. 2005-288331

(51) Int. Cl.
G02F 1/1335 (2006.01)
G02B 5/20 (2006.01)
(52) U.S. Cl. .................. 430/7; 349/106; 349/114
(58) Field of Classification Search .................. None
See application file for complete search history.

(56) References Cited

U.S. PATENT DOCUMENTS

| | | | |
|---|---|---|---|
| 5,926,241 A * | 7/1999 | Gunning, III | 349/117 |
| 6,016,178 A * | 1/2000 | Kataoka et al. | 349/117 |
| 7,332,201 B2 | 2/2008 | Ishizaki et al. | |
| 7,379,141 B2 | 5/2008 | Moriya | |
| 2004/0105059 A1 * | 6/2004 | Ohyama et al. | 349/114 |
| 2005/0195479 A1 * | 9/2005 | Ishizaki et al. | 359/490 |
| 2006/0055848 A1 * | 3/2006 | Kim et al. | 349/107 |
| 2006/0222783 A1 * | 10/2006 | Hayashi et al. | 428/1.1 |

FOREIGN PATENT DOCUMENTS

| | | |
|---|---|---|
| JP | A-07-258638 | 10/1995 |
| JP | A-10-508882 | 9/1998 |
| JP | A-2004-004494 | 1/2004 |
| JP | 2004-133179 A | 4/2004 |
| JP | 2005-024919 A | 1/2005 |
| JP | 2005-084271 A | 3/2005 |

* cited by examiner

*Primary Examiner* — John A. McPherson
(74) *Attorney, Agent, or Firm* — Oliff & Berridge, PLC

(57) ABSTRACT

A color filter of the present invention includes a substrate having light transmissivity, a color layer provided on the lower surface of the substrate and including a plurality of color pattern layers, each transmitting visible light of different color, and a phase difference control layer including a plurality of phase difference pattern layers and optically isotropic layers and provided on the lower surface of the color layer, wherein a color differentiation region includes a color pattern layer and a phase difference pattern layer and an optically isotropic layer that are provided on the lower surface of the color pattern layer is formed for each color of the color pattern layer, and the thickness of the phase difference pattern layer and the thickness of the color pattern layer are respectively different for each color differentiation region.

18 Claims, 3 Drawing Sheets

PRIOR ART

PRIOR ART

COLOR FILTER, SEMI-TRANSMISSIVE SEMI-REFLECTIVE LIQUID-CRYSTAL DISPLAY DEVICE, METHOD FOR FORMING PHASE DIFFERENCE CONTROL LAYER, AND METHOD FOR MANUFACTURING COLOR FILTER

BACKGROUND OF THE INVENTION

1. Field of the Invention

The present invention relates to a color filter which can reduce wavelength dispersion and can form a good circular polarization state over the entire visible light range and to a semi-transmissive semi-reflective liquid-crystal display device using such color filter, and also to a method for forming a phase difference (retardation) control layer and a method for manufacturing a color filter.

2. Description of the Related Art

A variety of liquid-crystal display devices have been developed, but according to a mode of using the light they can be generally classified into reflective liquid-crystal display devices that use an external light such as natural light or indoor light, transmissive liquid-crystal display devices that use an illumination light from a backlight, and semi-transmissive semi-reflective liquid-crystal display devices that can be both reflective and transmissive.

A device of the type shown in FIG. 4 has been suggested as one form of a semi-transmissive semi-reflective liquid-crystal display device. A semi-transmissive semi-reflective liquid-crystal display device 101a shown in FIG. 4 comprises an upper substrate 120 and a lower substrate 130 sandwiching a liquid-crystal layer 110.

A transparent electrode layer 135 and a semi-transmissive semi-reflective layer 134 are formed on the upper surface of the lower substrate 130. The transparent electrode layer 135 comprises indium tin oxide (ITO), and the semi-transmissive semi-reflective layer 134 comprises a reflective plate 134a made from a metal film such as aluminum and a light transmissive section 134b for transmission display.

Two phase difference plates 131, 132 are provided on the lower surface of the lower substrate 130, a polarization plate 133 is provided on the lower surface of the phase difference plate 132, and a backlight 140 is provided below the polarization plate 133. The reflective display using the external light is performed in a region (referred to hereinbelow as "reflective display region") where the reflective plate 134a is provided, and the transmissive display using the illumination light of the backlight 140 is performed in the region (referred to hereinbelow as "transmissive display region") where the transmissive section 134b is provided.

A black matrix 127 and a color layer 126 comprising a plurality of color pattern layers 126R, 126G, 126B are formed to a constant film thickness on the lower surface of the upper substrate 120, a protective layer 129 is provided on the lower surface of the color layer 126, and a transparent electrode layer 125 is provided on the lower surface of the protective film 129. On the other hand, similarly to the configuration formed on the lower substrate 130, two phase difference plates 121, 122 are provided on the upper surface of the upper substrate 120, and a polarization plate 123 is provided on the upper surface of the phase difference plate 122.

The phase difference plate provided on the lower surface of the lower substrate 130 comprises two phase difference plates 131 and 132, and the phase difference plate provided on the upper surface of the upper substrate 120 likewise comprises two phase difference plates 121 and 122. Using the two phase difference plates in such manner enables them to function as quarter-wavelength phase difference plates of a broad band type and to convert a linearly polarized light into a circularly polarized light over almost the entire visible light range.

Furthermore, because the configuration is employed in which the polarization plate and phase difference plate are provided respectively on the upper surface of the upper substrate 120 and the lower surface of the lower substrate 130, both the incident light from the backlight 140 and the incident light from the outside can be converted into the circularly polarized light.

However, the drawback of the above-described conventional liquid-crystal display device 101a in which two phase difference plates are provided via adhesive layers between the upper and lower substrates 120, 130 and the polarization plates is that because the thickness of the entire device is rather large, such a configuration cannot be adapted to decrease the device thickness.

Furthermore, the mixed light illuminated from the backlight 140 is transmitted via the polarization plate 133, becomes a linearly polarized light with the predetermined angle, and then passes through the quarter-wavelength phase difference plates 132, 131 and becomes a circularly polarized light, but if the circularly polarized light is reflected at the rear surface of the reflective plate 134a, the orientation of the circularly polarized light is inverted. For this reason, this reflected light is further polarized by the quarter-wavelength phase difference plates 131, 132, becomes a linearly polarized light with a transmission axis perpendicular to that of the aforementioned linearly polarized light, and falls on the polarization plate 133. As a result, this light is absorbed in the polarization plate 133, rather than transmitted therethrough. The resultant problem is that the collected light cannot be reflected again toward the liquid-crystal layer 110 by the backlight reflection plate 141 and the illumination light cannot be reused.

Japanese Patent Application Laid-open No. 2004-004494 discloses a semi-transmissive semi-reflective liquid crystal display 101b in which the phase difference control layer 137 overlaps a reflective display region in the lower substrate 130 and is finely patterned with the object of resolving the above-described problem. As shown in FIG. 5, with the liquid crystal display 101b of Japanese Patent Application Laid-open No. 2004-004494, a structure is obtained in which it is not necessary to provide two phase difference plates on the upper surface of the upper substrate 120 and lower surface of the lower substrate 130 and the light of the backlight can be reused.

Furthermore, in the liquid crystal display 101b, the incident light that is reflected by the reflective plate 134a passes twice through the color layer 126 and the resultant effect is adjusted by making the thickness and color density of the color layer 126 in the reflective display region less than those of the color layer in the transmissive display region.

One of the means for finely patterning the phase difference control layer 137 is a formation method by which a UV-curable liquid-crystal material is used, the liquid-crystal material is set to a constant orientation state, then the liquid-crystal material is locally photopolymerized by using a photolithography method, the phase difference control layer 137 is pattered, and the regions other than the phase difference control layer 137 are removed by etching.

Furthermore, an invention has been suggested that relates to a semi-transmissive semi-reflective liquid-crystal display device 101c of a structure in which the color layer 126 of the liquid-crystal display device 101b shown in FIG. 5 is provided on the lower surface of the upper substrate 120 and the phase difference control layer 137 is provided on the lower surface of the color layer 126, and an invention relating to a color filter 102 in such liquid-crystal display device 101c has also been suggested.

The liquid-crystal display device 101c is shown in FIG. 6. As shown in the figure, the advantage of the liquid-crystal display 101c is also in that it is not necessary to provide two phase difference plates on the upper and lower substrates 120, 130 and that the illumination light of the backlight 140 can be reused.

However, in the conventional semi-transmissive semi-reflective liquid-crystal display devices 101b, 101c shown in FIGS. 5 and 6, the color of light transmitted through color pattern layers constituting the color layer 126, that is, the wavelength of the visible light beam differs between the color pattern layers through which the light passes. As a result, in the phase difference control layer 137 in the conventional device having only the function of providing a uniform wavelength shift to the incident light, an optimum phase difference amount cannot be generated for each transmitted light. In other words, in the conventional phase difference control layer 137, good circularly polarized light cannot be obtained over the entire visible light range and a transition to a broader band in a liquid-crystal display device cannot be performed.

In order to broaden the band, a phase difference film having an inverted wavelength dispersion characteristic (for example, WRF film series manufactured by Teijin Corp.) or a phase difference film in which a half-wavelength phase difference plate is combined with a quarter-wavelength phase difference plate is generally used. However, polymerizable liquid-crystal materials generally have a wavelength dispersion characteristic of a refractive index such that the refractive index anisotropy increases at a short wavelength, and when the films of the same thickness are produced from the same material, a good circularly polarized state cannot be formed over the entire wavelength range of visible light.

This issue is described below in greater detail. The phase difference amount required for a phase difference plate (and the phase difference control layer) is different for each color (actually, the wavelength of the transmitted light) of the color pattern layer constituting the color layer. For example, if the central wavelength of the red color light is taken as 650 nm, the central wavelength of the green color light is taken as 550 nm, and the central wavelength of the blue color light is taken as 450 nm, then the phase difference amount required for a quarter-wavelength phase difference plate will be 650/4=163 nm for the red color light, 550/4=138 nm for the green color light, and 450/4=113 nm for the blue color light. For this reason, when optical designing is performed, the phase difference plate is designed so as to realize a circularly polarized light with a wavelength close to the green color (close to 550 nm) where the visual sensitivity is the highest.

Therefore, in the red color region and blue color region, the phase difference amount is insufficient or excessive, and a perfect circular polarization cannot be obtained. The resultant problem is that when black display is performed on a liquid-crystal screen, light components leak in those regions and a black display with a violet tint is obtained.

The present invention was created to resolve the above-described problems and it is an object of the present invention to provide a color filter for realizing a semi-transmissive semi-reflective liquid-crystal display device that can be reduced in thickness, this color filter making it possible to reduce the wavelength dispersion and to form a good circular polarization state over the entire visual light range.

Another object of the present invention is to provide a semi-transmissive semi-reflective liquid-crystal display device configured by using the color filter in which light leak during black display is small and high-grade display can be realized.

Yet another object of the present invention is to provide a method for forming a phase difference control layer for realizing the aforementioned color filter and liquid-crystal display device.

Still another object of the present invention is to provide a method for manufacturing a color filter suitable for the above-described liquid-crystal display device.

SUMMARY OF THE INVENTION

In accordance with the present invention, the occurrence of "quarter-wavelength phase difference" or "quarter-wavelength phase shift" means that the linearly polarized incident light became a circularly polarized outgoing light or that the circularly polarized incident light became a linearly polarized outgoing light. Likewise, the occurrence of "half-wavelength phase difference" or "half-wavelength phase shift" means that the linearly polarized incident light became an outgoing light polarized in the direction perpendicular thereto or that a right (left) rotation circularly polarized incident light became a left (right) rotation circularly polarized outgoing light of reversed rotation. Furthermore, a quarter- (or half-) wavelength phase difference is provided to the incident light by a quarter- (or half-) wavelength phase difference plate or quarter- (or half-) wavelength phase difference layer.

The color filter in accordance with the present invention comprises: a substrate having light transmissivity; a color layer provided on a lower surface of the substrate and comprising a plurality of color pattern layers each transmitting visible light of different color; and a phase difference (retardation) control layer comprising a plurality of phase difference (retardation) pattern layers provided on the lower surface of the color layer, wherein a color differentiation region comprising a color pattern layer and a phase difference pattern layer provided on the lower surface thereof is formed for each color of the color pattern layer, and the thickness of the phase difference pattern layer is different for each color differentiation region.

Not only the thickness of the phase difference pattern layer, but also the thickness of the color pattern layer is different for each color differentiation region.

In this implementation mode, the sum value of the thickness of the color pattern layer and the thickness of the phase difference pattern layer is constant in each color differentiation region.

An optically isotropic layer in which a phase difference (retardation) amount is substantially zero is provided on the lower surface of the color layer. Therefore, the phase difference control layer has a phase difference pattern layer and an optically isotropic layer.

In this mode, the thickness of the phase difference pattern layer and the thickness of the optically isotropic layer are respectively different for each color differentiation region.

The structure in which the thickness of the phase difference pattern layer and the thickness of the optically isotropic layer differ between the color differentiation regions has color pattern layers with a thickness that differs between the color differentiation regions.

The phase difference control layer is provided on the lower surface of the color layer via an orientation film.

The phase difference pattern layer is formed by an optically anisotropic liquid-crystal material. The phase difference pattern layer is preferably from an ultraviolet-polymerizable thermotropic liquid-crystal material.

The optically isotropic layer is formed by an optically isotropic liquid-crystal material.

A protective film is provided on the lower surface of the phase difference control layer.

The color filter of the above-described configuration is used as a component of a liquid-crystal display device. The semi-transmissive semi-reflective liquid-crystal display device in accordance with the present invention comprises:

the above-described color filter; a substrate provided below the color filter;

a liquid-crystal layer provided between the color filter and the substrate; and a reflective display region provided in the location facing a phase difference pattern layer in the color filter.

The phase difference control layer in the color filter can be formed by the following method comprising the steps of: depositing a layer of a polymerizable liquid-crystal composition comprising an ultraviolet-polymerizable liquid crystalline compound on an upper surface of a color layer having light transmissivity;

causing the orientation of the liquid crystalline compound at a liquid crystal phase temperature;

providing a photomask patterned according to a predetermined pattern on the upper surface of the polymerizable liquid-crystal composition; and forming a phase difference pattern layer by polymerizing and immobilizing the oriented liquid crystalline compound by ultraviolet exposure via the photomask at the liquid crystal phase temperature.

After the phase difference pattern layer has been formed by ultraviolet exposure at the liquid crystal phase temperature, a treatment is conducted to form an optically isotropic layer. First, the photomask is removed and then ultraviolet exposure is performed at an isotropic phase temperature to polymerize and immobilize the liquid crystalline compound that is not polymerized during ultraviolet exposure at the liquid crystal phase temperature.

In this process, the isotropic phase temperature is a temperature at which a thermal polymerization reaction proceeds and which is equal to or higher than an isotropic phase transition temperature of the liquid crystalline compound that is not polymerized during ultraviolet exposure at the liquid crystal phase temperature.

Furthermore, the temperature at which a thermal polymerization reaction proceeds is a temperature equal to or higher than an isotropic phase transition temperature of the liquid crystalline compound that is not polymerized during ultraviolet exposure at the liquid crystal phase temperature and is 170° C. to 260° C.

The following methods can be employed as a treatment for forming an optically isotropic layer. Thus, after the phase difference pattern layer has been formed by ultraviolet exposure at the liquid crystal phase temperature, the photomask is removed and then the liquid crystalline compound that is not polymerized during ultraviolet exposure at the liquid crystal phase temperature is heated to a temperature at which a thermal polymerization reaction proceeds and which is a temperature equal to or higher than an isotropic phase-transition temperature, and thermally polymerized and immobilized.

The method for manufacturing a color filter in accordance with the present invention, comprising the steps of: forming a plurality of color pattern layers each transmitting visible light of different color on the upper surface of a substrate having light transmissivity, so that the layers have a different thickness; forming a layer of a polymerizable liquid-crystal composition comprising an ultraviolet-polymerizable liquid crystalline compound on the upper surface of a color layer comprising a plurality of color pattern layers, so that a sum value of the thickness of the color layer and the thickness of the polymerizable liquid-crystal composition is constant in each color pattern layer; and causing the orientation of the liquid crystalline compound at a liquid crystal phase temperature.

Subsequent steps include: providing a photomask patterned according to a predetermined pattern on an upper surface of the layer of the polymerizable liquid-crystal composition; forming a phase difference pattern layer by polymerizing and immobilizing the oriented liquid crystalline compound by ultraviolet exposure via the photomask at the liquid crystal phase temperature.

The color filter is then obtained by removing the photomask and performing thermal polymerization and immobilization by heating the liquid crystalline compound that is not polymerized by ultraviolet exposure at the liquid crystal phase temperature to a temperature at which a thermal polymerization reaction proceeds and which is a temperature equal to or higher than an isotropic phase transition temperature.

The color filter in accordance with the present invention is configured so that the thickness of a phase difference pattern layer provided on the lower surface of a color pattern layer differs between the color differentiation regions corresponding to each color of the color pattern layer. As a result, when the color filter in accordance with the present invention is used in a semi-transmissive semi-reflective liquid-crystal display device, an optimum phase difference amount can be obtained for each color of the color pattern layer.

Because an optimum phase difference amount can thus be obtained with the color filter of the present invention according to a wavelength of the visible light passing through the color filter, wavelength dispersion can be reduced and a uniform circular polarization state can be formed over the entire visible light range.

Furthermore, with the semi-transmissive semi-reflective liquid-crystal display device in accordance with the present invention, color leak in the case of black display can be prevented and a high-grade display can be performed.

DESCRIPTION OF THE PREFERRED EMBODIMENTS

Figure 1:
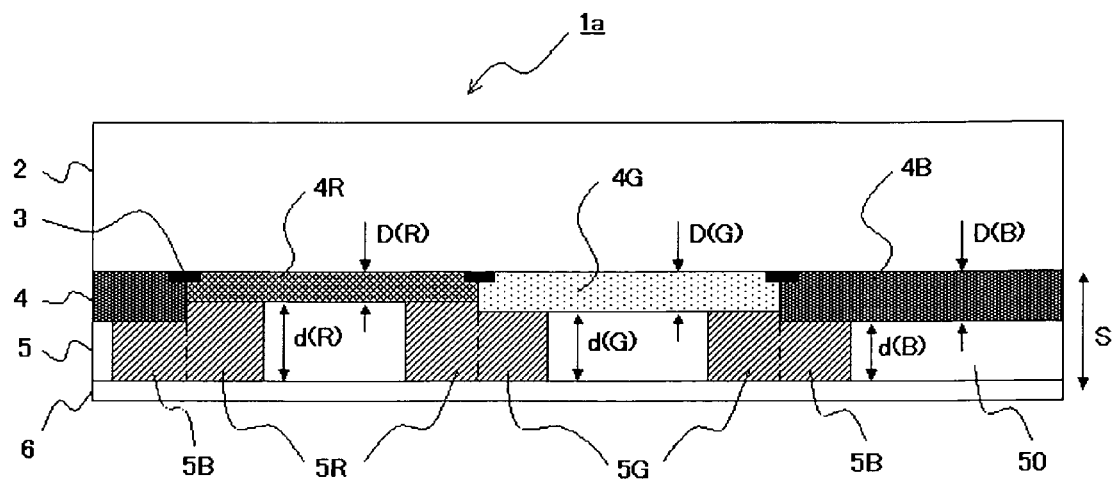
FIG. 1 is a cross-sectional schematic view illustrating an embodiment of the color filter in accordance with the present invention.

The embodiments of the present invention will be described below in greater detail. However, the present invention is not limited to the below-described embodiments. FIG. 1 is a cross-sectional schematic view illustrating an embodiment of a color filter 1a in accordance with the present invention.

In this color filter, a color layer of a light absorption type is formed on a substrate having light transmissivity, and the color filter is suitable, for example, as an optical element serving as a constituent member of a liquid-crystal orientation substrate of a liquid-crystal display device. Configurations that can combine various colors and can have micro color filters of different sizes and arrangement types can be employed as the micro color filters constituting the color layer.

The micro color filters are equivalent to color pixels, patterned and arranged for each color, and form color pattern layers of each color. A system of three primary colors of red (R), green (G), and blue (B) is generally used for the colors that are transmitted by the micro color filters, but such system is by no way limiting, and the color layer of the color filter in accordance with the present invention is not limited to those colors, provided that it is composed of micro color filters of at least two colors. A stripe-type, mosaic-type, and triangle-type arrangement can be used for the micro color filters, but the embodiment of the present invention using a stripe-type configuration will be exampled below.

The color filter 1a of the present embodiment has a color layer 4 and a phase difference control layer 5 formed on the lower surface of a substrate 2. Using the color filter 1a in combination with a linear polarization plate makes it possible to obtain not only a color function of transmitting the light of predetermined color in the color layer 4, but also functions identical to a function of a quarter-wavelength phase difference plate for obtaining circularly polarized light in the phase difference control layer 5 and a function of a half-wavelength phase difference plate that rotates the polarization angle of the linearly polarized light through 90 degrees.

In accordance with the present invention, it is preferred that orientation films be formed on the upper surface of the phase difference control layer that causes the orientation of the liquid crystalline material and a set of substrates sandwiching a liquid crystal layer for driving.

The phase difference control layer 5 used in the color filter 1a in accordance with the present invention preferably has a positive birefringence anisotropy and an optical axis that is horizontal with respect to a layer surface. Such phase difference control layer will be termed hereinbelow "a positive A plate". Furthermore, with the object of obtaining an optical compensation function of reducing the variation of an apparent refractive index when the view angle for the liquid-crystal display device increases, a phase difference layer having an optical axis perpendicular to the phase difference control layer and a negative birefringence anisotropy (such phase difference layer will be termed hereinbelow "a negative C plate") or a phase difference layer having an optical axis likewise perpendicular to the phase difference control layer and a positive birefringence anisotropy (such phase difference layer will be termed hereinbelow "a positive C plate") can be used by laminating on the inner surface side or outer surface side of the phase difference control layer 5 having the function of the aforementioned positive A plate.

As shown in FIG. 1, a black matrix 3 is provided on the lower surface of the transparent substrate 2 in the color filter 1a. The black matrix 3 has a shape comprising open sections and frame sections that form the open section. The frame sections can be in the form of a grid or stripes, but usually a grid-like shape is used.

When the color filter 1a is used in a liquid-crystal display device, the open sections of black matrix 3 are equivalent to the pixel sections of the device.

A color layer 4 comprising a red color pattern layer 4R, a green color pattern layer 4G, and a red color pattern layer 4B in which micro color filters having light transmissivity are arranged for each color is formed in the open sections of the black matrix 3. Here, R, G, B in the color pattern layers 4R, 4G, 4B stand for red color, green color, and blue color, respectively.

Furthermore, a phase difference control layer 5 having formed therein phase difference pattern layers 5R, 5G, 5B comprising liquid crystalline macromolecules is formed on the lower surface of the color layer 4.

A color differentiation region comprising the color pattern layer 4R (4G, 4B) and the phase difference pattern layer 5R (5G, 5B) provided on the lower surface thereof is formed for each color of the color pattern layers 4R, 4G, 4B. Thus, one color differentiation region is formed by the red color pattern layer 4R and phase difference pattern layer 5R, and another color differentiation region is formed by the green color pattern layer 4G and phase difference pattern layer 5G. Likewise, yet another color differentiation region is formed by the blue color pattern layer 4B and phase difference pattern layer 5B.

As shown in FIG. 1 the phase difference pattern layers 5R, 5G, 5B in each color differentiation region are formed to mutually different thicknesses.

As shown in the figure, the phase difference pattern layers 5R and 5G, 5G and 5B, and 5B and 5R are formed in a continuous manner adjacently to each other. A configuration in which phase difference pattern layers 5R 5G and 5B are formed in a continuous manner adjacently to each other is also possible.

It is preferred that the phase difference amount be substantially zero in the regions of the phase difference control layer 5 where the phase difference pattern layers 5R, 5G, 5B are not provided (optically isotropic layer 50). The optically isotropic layer 50 may be hollow or may be formed from a liquid crystalline polymer material comprising an optically isotropic phase or from another optically isotropic material.

When the color filter 1a is used in a liquid-crystal display device, and the liquid-crystal display device is of a semi-transmissive semi-reflective type, the phase difference pattern layers 5R, 5G, 5B of the phase difference control layer 5 are preferably provided in positions facing the reflective display regions.

Furthermore, in accordance with the present invention, the expression "the phase difference amount is substantially zero" in the optically isotropic layer 50 means that the phase difference amount in the optically isotropic layer 50 is 10% or less based on the phase difference amount of the incident light and transmitted light in the adjacent phase difference pattern layers 5R, 5G, 5B.

In accordance with the present invention, a liquid crystalline macromolecule indicates a molecule in which the liquid crystal state is fixed at room temperature, for example, a polymer obtained by crosslinking a liquid crystalline monomer having polymerizable groups in a molecular structure and conducting curing, while preserving the optical anisotropy that was assumed prior to crosslinking, or indicates a polymer-type liquid crystal that has a glass transition temperature, demonstrates a liquid crystal phase on heating to the glass transition temperature or higher, and enables the liquid crystal structure to be frozen by cooling thereafter to the glass transition temperature of below.

A protective film 6 is formed on the lower surface of the phase difference control layer 5.

The substrate 2 preferably has light transmissivity and is optically isotropic. If necessary, it can be locally provided with optically anisotropic or light-shielding regions. Light transmittance of the substrate 2 can be set at random.

Inorganic or organic materials can be used for the substrate 2, examples of the inorganic materials including glass, silicon, and quartz.

Examples of the organic materials include acryls such as poly(methyl methacrylate), polyamides, polyacetals, polybutylene terephthalate, polyethylene terephthalate, polyethylene naphthalate, triacetyl cellulose, syndiotactic polystyrene, polyphenylene sulfide, polyether ketones, polyether ether ketones, fluorine resins, polyether nitriles, polycarbonates, modified polyphenylene ethers, polycyclohexene, polynorbornane-type resins, polysulfones, polyethersulfones, polypropylene, polyallylate, polyamidoimides, polyetherimides, and thermoplastic polyimides, and plastics of general types can be also used. The thickness of the substrate 2 is, for example, about 5 μm to 3 mm.

The black matrix 3 prevents the light from leaking from between the pixels, for example, when the color filter 1a is incorporated in a liquid-crystal display device. Furthermore, in liquid-crystal display devices of an active matrix drive type, the black matrix functions as a light shielding layer provided to avoid light-induced deterioration of active elements.

No specific limitation is placed on the material of the black matrix 3 and a method for manufacture thereof. For example, the black matrix can be formed by applying a resin composition of a plating type comprising a black colorant to the entire surface on one side of the substrate 2, temporarily solidifying and then patterning by employing a photosensitive resin composition, or the black matrix can be formed by using a photosensitive resin composition of a paint type comprising a black colorant, coating, exposing, and developing.

The black matrix 3 may be also formed from a thin film of a metal, a metal oxide, or a metal nitride. For example, a two-layer chromium black matrix can be formed by forming a two-layer structure (CrOx/Cr) of CrOx (x is any integer) and Cr on one surface of the substrate 2 by an appropriate method such as vapor deposition, ion plating, or sputtering, and then patterning by using photolithography.

Furthermore, a three-layer chromium black matrix can be formed by similarly forming a three-layer structure (CrOx/CrNy/Cr) of CrOx, CrNy, (y is any integer), and Cr on one surface of the substrate 2 by an appropriate method such as vapor deposition and then patterning by using photolithography. The reflection factor of the three-layer chromium black matrix is reduced with respect to that of the two-layer chromium black matrix.

The black matrix 3 can be also formed by using an electroless plating method or a printing method using a black ink composition. In the case the black matrix 3 is formed from a thin film of a metal or the like, the thickness thereof is about 0.2 μm to 0.4 μm. When the black matrix is formed by a printing method, the thickness thereof is about 0.5 μm to 2 μm.

The pattern layers 4R, 4G, 4B of the color layer 4 can be constituted so as to be present only in the open sections of the black matrix 3, but usually the pattern layers 4R, 4G, 4B are provided continuously so that the pattern layers 4R, 4G, 4B overlap partially the black matrix 3. In such case, the pattern layers 4R, 4G, 4B can be provided in a stripe-like fashion in the front-to-rear direction in FIG. 1. As for the methods for forming such pattern layers, ink compositions colored in the predetermined colors may be prepared and then printing such as silk screen printing may be conducted for each pattern layer, but a method by which the substrate 2 is coated with a photosensitive resin composition of a paint type comprising colorants of predetermined colors and then patterning is conducted by photolithography is preferred because it allows the thickness of the color layer 4 to be adjusted with good accuracy. The thickness of the color layer 4 is preferably 1 μm to 5 μm.

The phase difference (retardation) required for the quarter-wavelength ($\lambda/4$) phase difference plate, which is an example of the positive A plate, is different for each color of the transmitted visible light and is 650/4=163 nm for the red color light, 550/4=138 nm for the green color light, and 450/4=113 nm for the blue color light.

Here, the if the thickness of the phase difference pattern layer 5R formed on the lower surface of the red color pattern layer 4R of the color layer 4 is denoted by d(R), the thickness of the phase difference pattern layer 5G formed on the lower surface of the green color pattern layer 4G of is denoted by d(G), and the thickness of the phase difference pattern layer 5B formed on the lower surface of the blue color pattern layer 4B of is denoted by d(B), then in order to obtain the aforementioned phase difference (retardation) with the phase difference control layer 5, the following conditions are preferably satisfied: $\Delta n(R) \times d(R)=163$ nm, $\Delta n(G) \therefore d(G)=138$ nm, $\Delta n(B) \therefore d(B)=113$ nm. Here, $\Delta n(R)$, $\Delta n(G)$, and $\Delta n(B)$ are the differences between the refractive index of the material constituting the phase difference control layer 5 in the optical axis direction and the refractive index in the direction perpendicular to the optical axis direction. Therefore, it is preferred that the thicknesses of the phase difference pattern layers 5R, 5G, 5B be as follows: $d(R)=163/\Delta n(R)$ [nm], $d(G)=138/\Delta n(G)$ [nm], and $d(B)=113/\Delta n(B)$ [nm].

Likewise, the phase difference amount for obtaining the function of the half-wavelength ($\lambda/2$) phase difference plate, which is an example of the positive A plate, in the phase difference control layer 5 is 650/2=325 nm for the redo color light, 550/2=275 nm for the green color light, and 450/2=225 nm for the blue color light. Therefore, the thickness of the phase difference pattern layers 5R, 5G, 5B formed on the lower surface of the color pattern layers 4R, 4G, 4B is preferably $d(R)=325/\Delta n(R)$ [nm], $d(G)=275/\Delta n(G)$ [nm], and $d(B)=225/\Delta n(B)$ [nm].

Here, when the phase difference control layer 5 is configured from a liquid-crystal material, $\Delta n(R)$, $\Delta n(G)$, and $\Delta n(B)$ generally satisfy the following relationship $\Delta n(R)<\Delta n(G)<\Delta n(B)$ because of a wavelength dispersion characteristic of the refractive factor of liquid-crystal materials.

Therefore, the following relationship between the d(R), d(G), d(B) of the phase difference pattern layers 5R, 5G, 5B can be deducted: $d(R)>d(G)>d(B)$.

Thus, in order to obtain the most advantageous function of the positive A plate used in the quarter- or half-wavelength phase difference plate in the color filter in accordance with the present invention, it is preferable that the thickness of the phase difference pattern layers decrease from the thickness d(R) of the phase difference pattern layer 5R formed on the lower surface of the red color pattern layer 4R, this thickness being the largest, to the thickness d(G) of the phase difference pattern layer 5G formed on the lower surface of the green color pattern layer 4G, and then to the thickness d(B) of the phase difference pattern layer 5B formed on the lower surface of the red color pattern layer 4B (thickness d(B) is the smallest).

The phase difference control layer 5 having a function of the positive A plate is preferably provided so that the optical axis is horizontal in the layer plane of the phase difference control layer 5 and the lower surface of the phase difference control layer 5 forms a plane parallel to the lower surface of the substrate 2. However, the present invention is not limited to such implementation mode, and a mode is also possible in which the lower surface of the phase difference control layer 5 is not parallel to the lower surface of the substrate 2 and peaks and valleys are present on the lower surface of the phase difference control layer 5.

The mode in which the lower surface of the phase difference control layer 5 is parallel to the lower surface of the substrate 2 will be described below. As described above, the phase difference pattern layers 5R, 5G, 5B corresponding to the color pattern layers 4R, 4G, 4B have different thicknesses, and in order to obtain a configuration in which the lower surface of the phase difference control layer 5 is parallel to the lower surface of the substrate 2, the thicknesses of the color pattern layers 4R, 4G, 4B constituting the color layer 4 also have to be different.

As shown in FIG. 1, the color layer 4 is formed so that the thickness is different for red, green, and blue colors, and the thickness of color pattern layers 4R, 4G, 4B are different in each color differentiation region. If the thickness of the red color pattern layer 4R is denoted by D(R), the thickness of the green color pattern layer 4G is denoted by D(G), and the thickness of the blue color pattern layer 4B is denoted by D(B), then the relationship D(B)>D(G)>D(R) is valid. Thus, the thickness of the blue color pattern layer 4B is the largest, and the thickness of the color pattern layers decreases in the order of the thickness D(G) of the green color pattern layer 4G and the thickness D(R) of the red color pattern layer 4R (D(R) is the smallest thickness).

When the thickness of the color layer 4 is increased, the color balance of the color filter 1a is adjusted by decreasing the blending amount ratio of the colorant present in the photosensitive resin composition. Conversely, when the thickness of the color layer is decreased, the adjustment is made by increasing the blending amount ratio of the colorant.

In order to change the thickness of the color layer 4 for each color, the coating thickness of the photosensitive resin layer comprising the colorant is changed, and the coating thickness can be changed by controlling the coating conditions or silk screen printing conditions and also by varying the viscosity of the photosensitive resin composition.

The above-described embodiment in which the thicknesses of the phase difference pattern layers 5R, 5G, 5B were different represents a case where the phase difference control layer 5 has a function of the positive A plate.

On the other hand, when a function of the positive or negative C plate is obtained with the phase difference control layer 5, it is necessary to provide the phase difference amount different from that of the quarter- or half-wavelength phase difference plate.

Accordingly, the thicknesses of the phase difference pattern layers 5R, 5G, 5B corresponding to each color pattern layer are different from those in the above-described case where the phase difference control layer 5 had a function of the positive A plate, and the variation of the thickness can be such that the thickness d(R) of the phase difference pattern layer 5R is the largest and then the thickness decreases in the order of the thickness d(G) of the phase difference pattern layer 5G and the thickness d(B) of the phase difference pattern layer 5B (d(B) is the smallest) or such that the thickness d(R) of the phase difference pattern layer 5R is the smallest and then the thickness increases in the order of the thickness d(G) of the phase difference pattern layer 5G and the thickness d(B) of the phase difference pattern layer 5B (d(B) is the largest).

A variety of methods can be used to change the thickness of the phase difference pattern layers in the phase difference control layer 5. As described above, in terms of the thickness of the phase difference pattern layers, there are a mode in which the lower surface of the phase difference control layer 5 is parallel to the lower surface of the substrate 2 and the mode in which they are not parallel.

A method for forming the phase difference pattern layers in the former mode will be described below. The sum value of the thickness of the color pattern layer of the color layer 4 and the thickness of the phase difference pattern layer of the phase difference control layer 5 is taken as a constant value S, the thickness of the phase difference pattern layers is found, and then the thicknesses D(R), D(G), D(B) of the color pattern layers 4R, 4G, 4B are determined from the following relationships: D(R)=S−d(R), D(G)=S−d(G), D(B)=S−d(B).

The color layer 4 is formed on the substrate 2 by coating by varying the thickness according to the color pattern layer, and then a phase difference control layer 5 is formed by coating on the color layer 4 by varying the thickness according to the phase difference pattern layer. FIG. 1 shows a mode in which the color layer 4 and phase difference control layer 5 were formed by such method. With this mode, the sum value of the thickness of the phase difference pattern layer and the thickness of the color pattern layer is constant in each color differentiation region.

The method for forming the phase difference pattern layers in the latter mode will be described below. A color layer 4 is formed by coating to a uniform thickness on the substrate 2 and then a phase difference control layer 5 is formed by coating on the color layer 4 by varying the thickness according to the phase difference pattern layer. In the color filter 1a obtained by such method, the lower surface of the color layer 4 is flat, and peaks and valleys are formed on the lower surface of the phase difference control layer 5.

The patterning for forming the phase difference pattern layers that differ in thickness can be performed, for example, by repeatedly performing the process comprising the steps of: (1) coating a liquid-crystal material; (2) pre-baking; (3) patterning and exposing via a photomask; (4) developing by using an organic solvent or the like; and (5) post-baking, while varying the coating film thickness of the liquid-crystal material, but the problem associated with such process is that it involves many steps.

On the other hand, a similar number of steps is also required for forming the color layer 4, but because the ink composition is different for each color in the color layer 4, the color pattern layers have to be formed by repeating the patterning operations correspondingly to the number of colors.

Therefore, even when the color pattern layers are formed by coating in which the thickness thereof is changed for each R, G, B color, it is suffice to increase or decrease the coating amount of the material, without increasing the number of steps in the entire process.

Therefore when a liquid crystalline polymer material of the phase difference control layer 5 is coated on the entire surface of the color layer 4 having color pattern layers of different thickness and the coating is so performed that the total thickness of both layers is uniform over the entire surface, it would suffice to implement the step of coating and polymerizing the liquid crystalline polymer material only once for the entire surface of the color layer 4 and it is not necessary to repeat identical operations for each color pattern layer. Therefore, the total number of process steps is not increased with respect to that of the conventional process.

With the method for forming the phase difference control layer 5 in accordance with the present invention, the phase difference pattern layers 5R, 5G, 5B can be finely adjusted to the desired thickness and band broadening of the color filter 1a can be realized, without increasing the number of process steps with respect to that of the conventional process.

The thickness of the color pattern layers 4R, 4G, 4B constituting the color layer 4 and the thickness of the phase difference pattern layers 5R, 5G, 5B corresponding thereto can sometimes deviate from the values derived from the above-described relationship under the effect of coating conditions and solvent evaporation during coating of those layers. Furthermore, the following scenarios are possible for the color layer 4 having the color pattern layers of different thickness: peaks and valleys appear therein due to the difference in thickness and the phase difference control layer 5 is formed by coating a liquid crystalline polymer material on such color layer 4, and the surface of the phase difference control layer 5 is not flat over the entire area and very small peaks and valleys appear on this surface. For example, in locations where a thick phase difference pattern layer has to be formed, the thickness is actually small.

With consideration for those issues and also to realize a phase difference amount that is different for each color light, it is preferred that the thicknesses d(R), d(G), d(B) of the phase difference pattern layers formed on each color pattern layer be ±20% or less, preferably ±15% or less of the theoretical values.

In order to prevent the appearance of a difference between the thickness of the phase difference pattern layers and the theoretical values due to the presence of peaks and valleys on the color layer 4, for example, in the location where the thickness might decrease due to the peaks and valleys of the color layer 4, the corresponding color pattern layer may be coated to a thickness less than the theoretical value and then the coating thickness of the phase difference control layer 5 formed by coating thereupon may be increased.

In accordance with the present invention, when the deviation of the thickness of the phase difference pattern layers 5R, 5G, 5B from the theoretical values is ±20% or less, the sum of the thicknesses of the color pattern layers 4R, 4G, 4b and the thicknesses of the phase difference pattern layers 5R, 5G, 5B formed correspondingly to respective color pattern layers is considered to be substantially constant.

As described hereinabove, peaks and valleys sometimes occur on the surface of the phase difference control layer 5 when this layer is formed, but this may be prevented by covering the upper surface of the liquid crystalline polymer material with a film or a glass plate to flatten forcibly the upper surface.

Fine adjustment of the thickness of the color pattern layers 4R, 4G, 4B for each color can be performed by controlling the exposure and heating conditions of the coating thickness of the material when each color pattern layer is formed by using a photosensitive of thermosensitive resin composition. Thus, after the color layer 4 has been formed on the substrate 2, a material for forming the phase difference control layer is coated on the color layer 4, masking is performed and then the predetermined exposure is conducted to form the phase difference pattern layers whose thickness differs correspondingly to the thickness of each color pattern layer of the color layer 4.

As a result, the thickness of the phase difference pattern layers can be varied for each corresponding color, without repeatedly performing the patterning operation. By contrast with the conventional color filter in which a phase difference control plate of a predetermined thickness is adhesively bonded to a substrate via a pressure-sensitive adhesive layer, the phase difference control layer 5 in accordance with the present invention can be formed as a thick layer with a thickness of several micron. Therefore, the thickness of the color filter can be reduced and, therefore, the entire liquid-crystal display device 7 can be made thinner.

The phase difference control layer 5 that comprises a liquid crystalline polymer material and has an optical axis horizontal with respect to the layer surface of the phase difference control layer can be formed by polymerizing a polymerizable liquid-crystalline monomer. More specifically, the phase difference pattern layers 4R, 4G, 4B can be formed by coating a photopolymerizable liquid-crystal composition in which a photopolymerization initiator is blended with a monomer on one surface of a color layer 4 and conducting ultraviolet exposure via the predetermined pattern.

Furthermore, when the phase difference control layer 5 is formed with an optical axis perpendicular to the phase difference control layer, a photopolymerizable liquid-crystal composition is used in which a polymerizable chiral agent is blended with a polymerizable liquid crystalline monomer. The phase difference control layer 5 can be formed by polymerizing this composition in the same manner as described above.

The liquid crystalline polymer constituting the phase difference control layer 5 is a polymer in which the liquid crystal state is immobilized by using irradiation with ionizing radiation. More specifically, it is a polymer in which a liquid crystalline monomer having an unsaturated bond group in a molecular structure is three dimensionally crosslinked in a liquid crystal state and the liquid crystal structure is immobilized, while the orientation characteristic thereof is being maintained. Examples of three-dimensionally crosslinkable liquid crystalline monomers include liquid crystalline monomers such as disclosed in Japanese Patent Application Laid-open No. 07-258638 and Japanese Patent Application Laid-open No. 10-508882. Specific examples of such three-dimensionally crosslinkable liquid crystalline monomers include compounds (I) represented by the general formula (1) represented by [Formula 1] below and compounds (II) represented by [Formula 2] below. Furthermore, those compounds also have thermal polymerization ability. A single compound from the compounds (I) represented by the general formula (1) or a mixture of two or more thereof, and a single compound from the compounds (II) represented by [Formula 2] or a mixture of two or more thereof, or the combination of such compounds can be used as the monomer materials constituting the liquid crystalline polymer that can be used in accordance with the present invention.

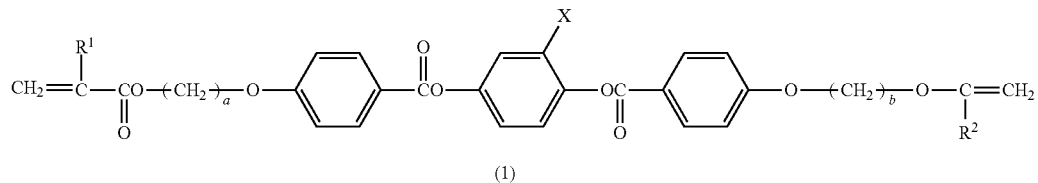

[Formula 1]

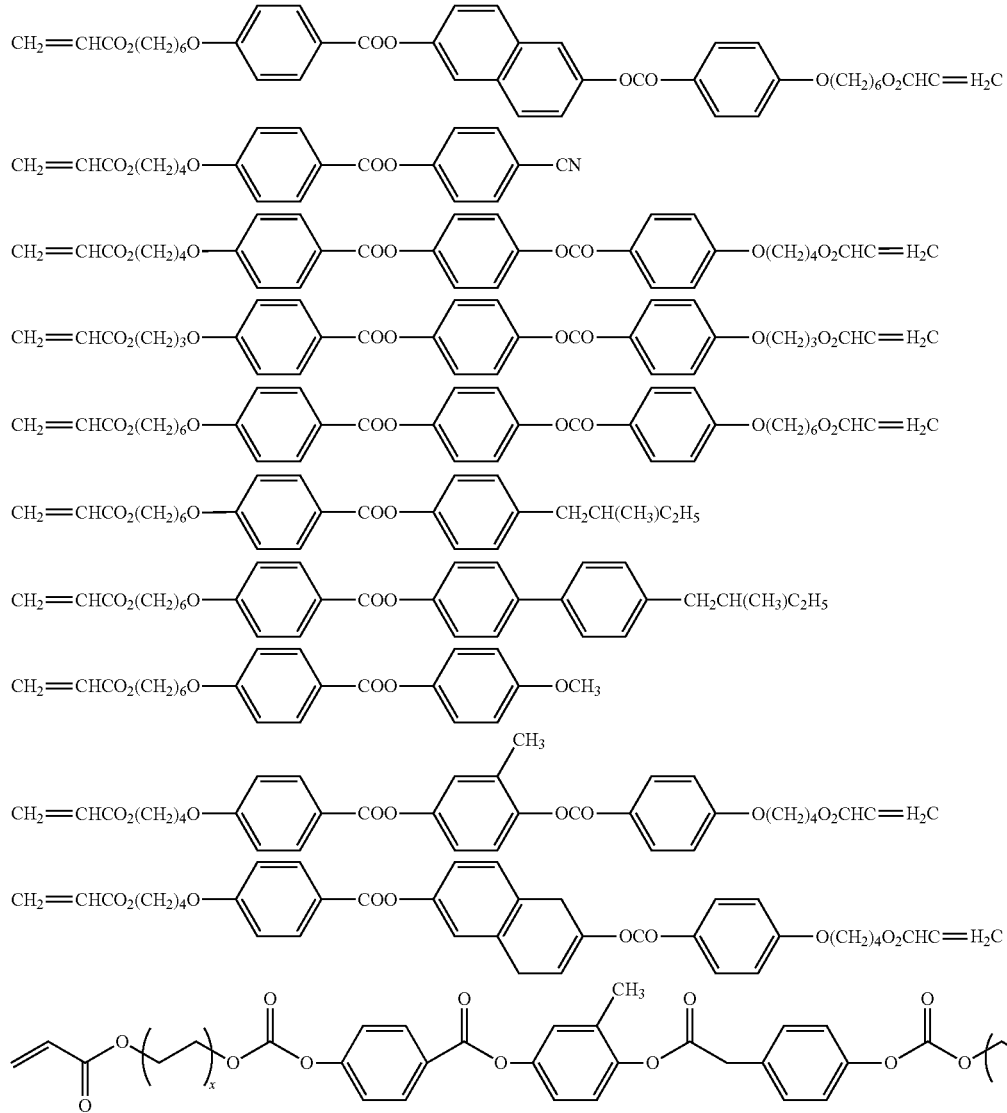

[Formula 2]

X is integer of 2 to 5

In the general formula (1) representing the compounds (I), each of $R^1$ and $R^2$ is hydrogen or a methyl group, but from the standpoint of the broadness of a temperature range in which a liquid crystal phase is demonstrated, it is preferred that both $R^1$ and $R^2$ be hydrogen. X is hydrogen, chlorine, bromine, iodine, an alkyl group having 1 to 4 carbon atoms, a methoxy group, a cyano group, or a nitro group, but chlorine and methyl group are preferred. Furthermore, symbols a and b representing the chain length of the alkylene group serving as a spacer of the aromatic ring of the compound (I) and the (meth)acryloyloxy group at both ends of the molecular chain can be any integers in a range of 2 to 12, but the range of 4 to 10 is preferred, and the range of 6 to 9 is even more preferred. The compound represented by the general formula (1) in which a and b are less than 2 is susceptible to hydrolysis and has poor stability. Moreover, the crystallinity of the compound itself is high. In the compound represented by the general formula (1) in which a and b are more than 12, the isotropic phase transition temperature (TI) is low. The compounds in which a and b are not contained in a range of 2 to 12 are undesirable because of a narrow temperature range in which liquid crystal properties are demonstrated.

All the above-described three-dimensionally crosslinkable compounds are polymerizable liquid crystal monomers that can assume nematic regularity, but the present invention is not limited thereto and polymerizable liquid-crystal oligomers or polymerizable liquid-crystal polymers demonstrating the nematic orientation regularity can be appropriately selected and used.

In order to form the phase difference control layer 5 in accordance with the present invention, a chiral agent may be added to the above-described polymerizable liquid crystal with nematic orientation ability. Chiral nematic liquid crystals having cholesteric regularity that are obtained due to the addition of this agent can be advantageously used as liquid crystals constituting the phase difference control layer 5. In accordance with the present invention, the chiral agent is used when the negative C plate is formed.

The chiral agent that can be used in accordance with the present invention is employed with the object of inducing a spiral pitch in the positive monoaxial nematic regularity demonstrated by the compounds described in compounds (I) included in the general formula (1) and compounds (II). Therefore, it is important that they be the compounds having optically active sites in a molecule. Specific examples of such compounds include compounds having at least one asymmetrical carbon, compounds in which an asymmetrical point is on a hetero atom, such as chiralic amine and chiralic sulfoxides, and compounds having axial asymmetry, such as coumarin and binaphthol. For example, commercial chiral nematic liquid crystals, more specifically, S-811 manufactured by Merck Co., can be used. The molecular weight of the chiral agent is preferably 1500 or less.

Depending on the properties of the selected chiral agent, the crystal liquid orientation ability of the liquid crystalline compounds can be destroyed or reduced. In addition, when a large amount of chiral agent having optically active sites is used, the cost of the liquid-crystal material composition increases. Therefore, it is preferred that a chiral agent demonstrating a strong effect of inducing a spiral pitch in the orientation of liquid crystalline molecules be used as the chiral agent employed, in accordance with the present invention. Specific examples, are the compounds represented by general formula (2)-(4) shown in [Formula 3], and it is preferred that low-molecular compounds having axial asymmetry in a molecule be used.

[Formula 3]

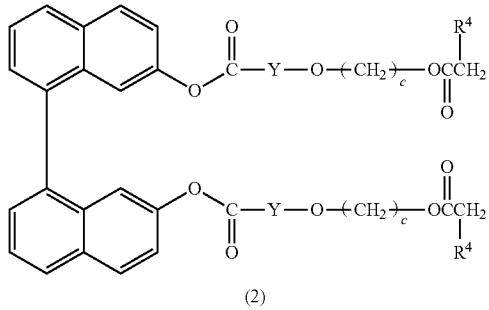

(2)

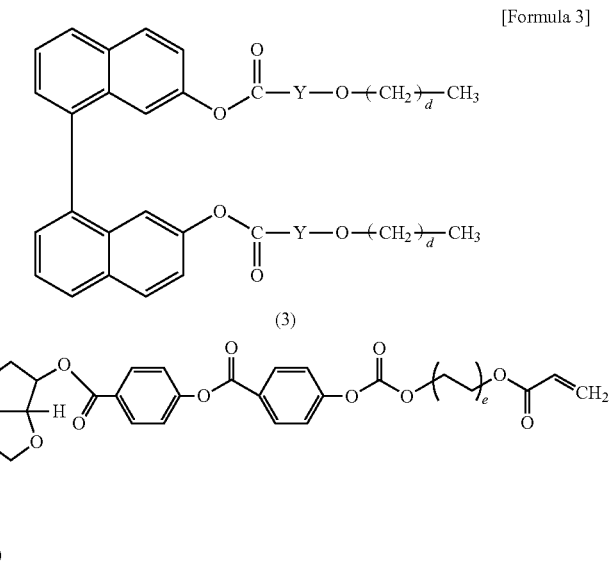

(3)

(4)

e is integer of 2 to 5

[Formula 4]

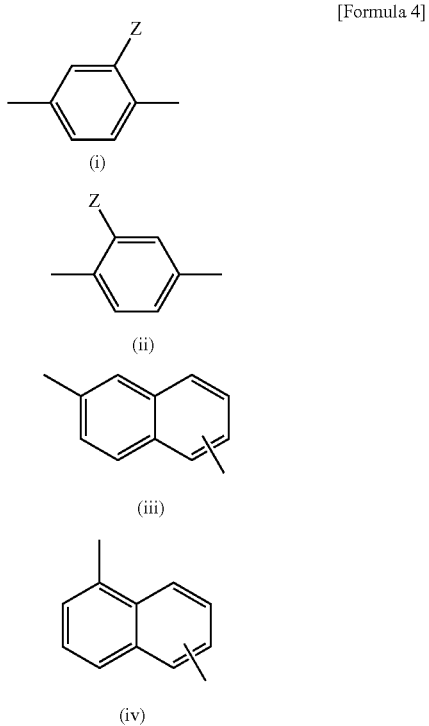

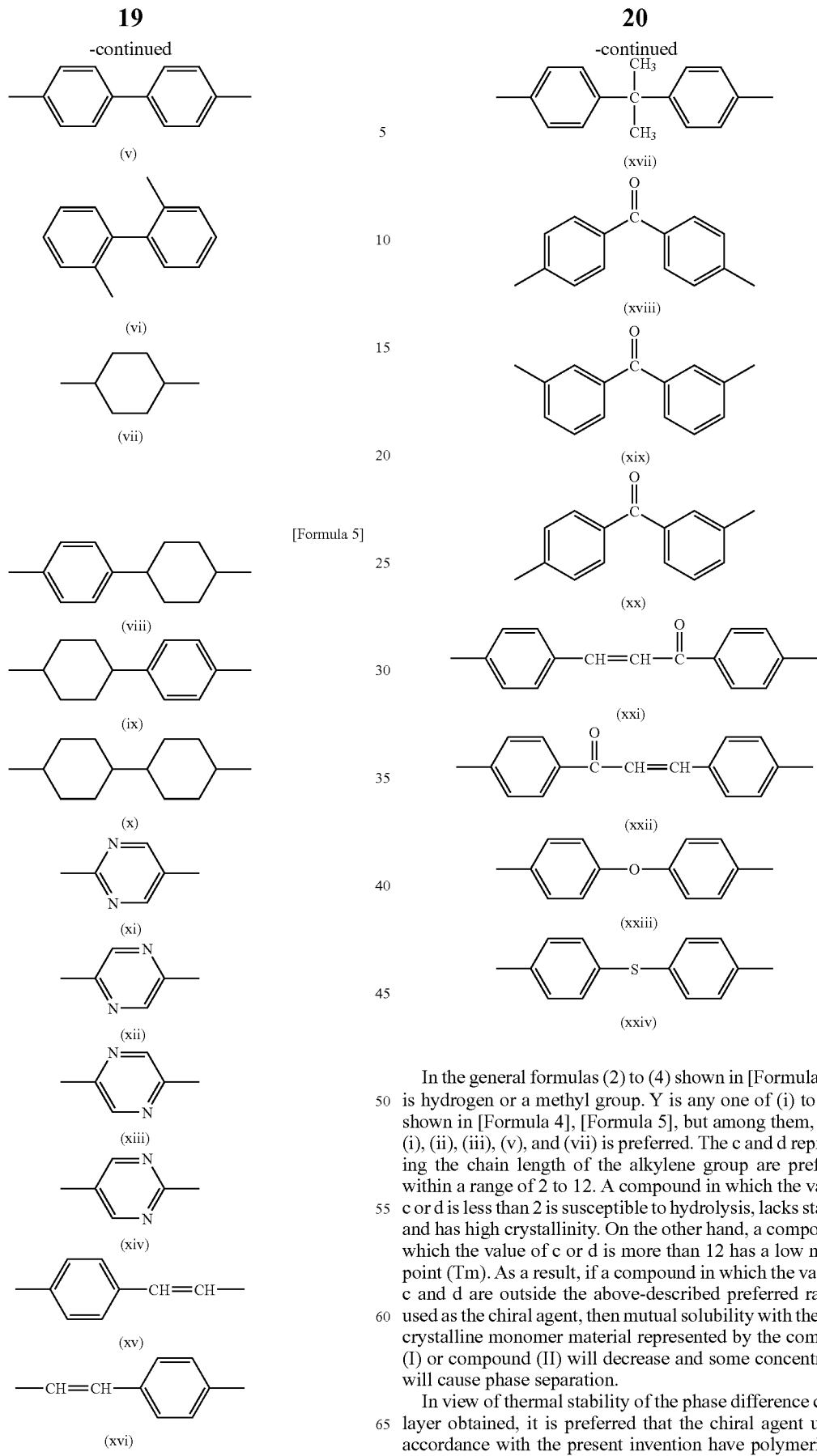

In the general formulas (2) to (4) shown in [Formula 3], $R^4$ is hydrogen or a methyl group. Y is any one of (i) to (xxiv) shown in [Formula 4], [Formula 5], but among them, any of (i), (ii), (iii), (v), and (vii) is preferred. The c and d representing the chain length of the alkylene group are preferably within a range of 2 to 12. A compound in which the value of c or d is less than 2 is susceptible to hydrolysis, lacks stability, and has high crystallinity. On the other hand, a compound in which the value of c or d is more than 12 has a low melting point (Tm). As a result, if a compound in which the values of c and d are outside the above-described preferred range is used as the chiral agent, then mutual solubility with the liquid crystalline monomer material represented by the compound (I) or compound (II) will decrease and some concentrations will cause phase separation.

In view of thermal stability of the phase difference control layer obtained, it is preferred that the chiral agent used in accordance with the present invention have polymerization ability enabling the copolymerization with the above-described three-dimensionally crosslinkable liquid crystalline monomers and the fixation of the cholesteric regularity. In particular, in terms of obtaining a phase difference control layer with good heat resistance, it is preferred that a chiral agent having polymerizable functional groups at both ends of the molecule be used.

However, the chiral agents that can be used in accordance with the present invention are not limited to those having polymerization ability, and even if a chiral agent has no polymerization ability, it still can be used as the chiral agent in accordance with the present invention, provided that it can impart a cholesteric property to the liquid crystalline monomer.

A phase difference control layer having short-pitch cholesteric regularity can be effectively formed with the chiral agent represented by the general formulas (2) to (4) shown in [Formula 3]. However, the present invention is not limited to the aforementioned chiral agents. Thus a chiral agent can be used in accordance with the present invention, provided that it is mutually soluble with the compound (I) or compound (II) in a solution state or a melt state, does not degrade the liquid crystal ability of the liquid crystalline polymer, and can induce a spiral pitch in a positive monoaxial nematic regularity demonstrated by such liquid crystalline polymers.

The amount of the chiral agent blended with the three-dimensionally crosslinkable liquid crystalline monomer material in accordance with the present invention can be appropriately selected based on the amount of the liquid crystalline polymer material used, spiral pitch inducing capacity, and cholesteric properties of the finally obtained polarization selective reflecting layer (that is, the phase difference control layer). In particular, with respect to the relationship with the amount of the liquid crystalline monomer material used, the chiral agent is preferably compounded within a range of 0.01 to 60 parts by weight, preferably 0.1 to 40 parts by weight, more preferably 0.5 to 30 parts by weight, and most preferably 1 to 20 parts by weight per a total of 100 parts by weight of the liquid crystalline monomer material. When the compounded amount of the chiral agent is less than 0.01 part by weight per 100 parts by weight of the liquid crystalline monomer material, a sufficient cholesteric properties sometimes cannot be imparted to the liquid crystalline monomer, and when the compounded amount of the chiral agent exceeds 60 parts by weight, the orientation of the liquid crystalline monomer material is impeded and an adverse effect can be produced when the orientation is fixed by active radiation such as ultraviolet radiation during the formation of the phase difference control layer 5.

A method for forming the phase difference control layer 5 will be described below.

Color pattern layers 4R, 4G, 4B with respectively different thicknesses are formed by coating on the substrate 2, and then an orientation film (not shown in the figure) is formed on the color layer 4 composed of those color pattern layers. The orientation film is a thin film serving to cause the orientation of liquid-crystal macromolecules constituting the phase difference control layer 5 in a predetermined direction, and the thickness of the orientation film is much smaller than the thickness of the color layer 4 and phase difference control layer 5. Therefore, even after the orientation film has been formed by coating on the color layer 4, the peaks and valleys present on the surface of the color layer 4 formed by the color pattern layers of different thickness will be maintained.

The orientation film is formed by coating a resin liquid such as a polyamide resin or polyimide resin on the color layer 4, forming a resin coating film, and performing a rubbing treatment by rubbing the upper surface of the resin coating film in the predetermined direction with a roller or the like having a cloth wound thereupon. When a phase difference control layer is formed by laminating two layers, the orientation film is preferably stacked between the first layer and the second layer.

The above-described liquid crystal composition having photopolymerization ability is coated on the orientation film that was thus formed. This coating may be performed by optionally dissolving or diluting the liquid-crystal composition with a solvent and using a spin coating, die coating, or slit coating method.

The coated amount of the liquid-crystal composition is selected such that the peaks and valleys present on the surface of the color layer 4 are not reproduced and the surface of the coated liquid-crystal composition becomes flat. As a result, the coating thickness of the liquid-crystal composition also locally varies according to the difference in thickness between the color pattern layers 4R, 4G, 4B.

Then, a pre-baking treatment is performed by heating the liquid-crystal composition together with the substrate 2 and color layer 4 to a liquid crystal phase temperature to cause the orientation of liquid crystal molecules. The temperature of the pre-baking treatment is preferably 60° C. to 140° C. Then, only the locations where the phase difference pattern layers 5R, 5G, 5B have to be formed, that is, only the portions serving as reflection display region when the color filter is used in combination with a semi-transmissive semi-reflective liquid-crystal display device are pattern exposed with ultraviolet radiation. More specifically, masking is performed so that the regions where the phase difference pattern layers 5R, 5G, 5B have to be formed are opened, these regions are irradiated with ultraviolet radiation, and the liquid-crystal composition located in these regions is polymerized and cured.

The "liquid crystal phase temperature" as referred to herein is a temperature range in which the liquid-crystal composition demonstrates a liquid crystal phase. In addition to the temperature range from a liquid phase transition temperature to the isotropic phase transition temperature, the liquid crystal phase temperature includes also a temperature range of an overcooled state or overheated state, provided that the liquid-crystal composition still demonstrates a liquid crystal phase. The same relates to the "isotropic phase temperature" that means a temperature range in which the liquid-crystal composition still demonstrates an isotropic phase.

In the phase difference control layer 5, an optically isotropic layer 50 is formed in the portions outside the phase difference pattern layers 5R, 5G, 5B. No specific limitation is placed on a method for forming the optically isotropic layer. For example, the optically isotropic layer 50 can be formed by etching and removing the portions outside the phase difference pattern layers 5R, 5G, 5B that were cured by photopolymerization and filling the gaps of the removed sections with an optically isotropic material.

In this case, in order to omit a process of filling the gaps of the removed sections with an optically isotropic material, it is preferred that the mask be removed after the phase difference pattern layers 5R, 5G, 5B have been cured by ultraviolet exposure and then the entire configuration be heated to a temperature effectively advancing thermal polymerization in an isotropic phase temperature state. The temperature of this heating treatment is preferably 170° C. to 260° C., similarly to the heating temperature of the below-described post-baking treatment.

Reactive unsaturated double bonds present in liquid crystal molecules polymerizable by ultraviolet radiation are generally also polymerized on heating. Because the degree of curing of the phase difference control layer that was immobilized by ultraviolet irradiation via a mask is insufficient when only ultraviolet curing is employed, it is preferred that a heating treatment (post-baking treatment) be conducted after the ultraviolet exposure to complete the polymerization reaction.

The post-baking treatment is preferably conducted by heating at a temperature of 170° C. or higher. Under heating at a temperature of 170° C. or higher, double bonds positioned at one end or both ends of a liquid crystal molecule are ring-opened and the polymerization reaction is advanced. In the case such post-baking is not carried out, when heating is conducted at a high temperature after the formation of the phase difference control layer 5, for example, to form an orientation film for operating the liquid crystals, the orientation of liquid crystal molecules that have not been completely polymerized in the phase difference control layer 5 immobilized in advance by ultraviolet irradiation will change by heat of the heating treatment, and the phase difference amount of the phase difference pattern layers 5R, 5G, 5B that was finely adjusted for each color will change.

Therefore, when the liquid-crystal compound that was cured by ultraviolet radiation is subjected to post-baking, heating has to be conducted at a temperature at which the polymerization reaction of the liquid crystal compound is completed.

On the other hand, the higher is the heating temperature, the faster is the polymerization reaction of the liquid crystal molecules, but in a temperature region above 260° C., the decomposition reaction becomes predominant and the phase difference layers themselves are greatly deteriorated. In particular, in the case of a liquid crystal compound in which a liquid crystal molecule has reactive unsaturated double bonds at both ends, if heating is conducted at a temperature in excess of 260° C., the orientation of the polymerized liquid crystal molecules can change due to thermal perturbation, the phase difference can decrease, and the polymerized liquid-crystal composition itself can be decomposed. For this reason, in accordance with the present invention, it is preferred that the heating temperature of the post-baking treatment be set within a range of 170° C. to 260° C., regardless of the type of the liquid crystalline polymer materials.

The ultraviolet exposure process implemented by using masking forms a liquid crystal compound layer that was polymerized and cured by the ultraviolet radiation and a liquid crystal compound layer that was not affected by the ultraviolet radiation and was not polymerized or cured. If the mask is removed and the above-described post-baking treatment is conducted after the ultraviolet exposure process, the liquid crystal compound layer in which polymerization and curing have not occurred will undergo phase transition to an optically isotropic material and subsequent polymerization and curing in this state can form the optically isotropic layer 50.

Accordingly, such processes as solvent development and dry etching become unnecessary and patterning of the phase difference pattern layers 5R, 5G, 5B can be conducted in a very small number of process steps. Furthermore, by contrast with the conventional procedure in which the un-polymerized portions are removed by solvent development or dry etching after forming the phase difference pattern layers 5R, 5G, 5B, the boundaries between the phase difference pattern layers 5R, 5G, 5B and optically isotropic layer 50 can be formed with a very high accuracy. Therefore, the phase difference control layer 5 can be formed with a high resolution.

Furthermore, in the formation of the optically isotropic layer, in addition to the above-described thermal polymerization induced by post-baking, the optically isotropic layer 50 can be also polymerized by heating to an isotropic phase state and performing ultraviolet exposure. In this case, because ultraviolet radiation is used for curing, not specific limitation is placed on the heating temperature, provided that the isotropic phase is demonstrated thereat. However, when ultraviolet exposure is performed at a heat-induced polymerization temperature of 170° C. to 260° C. as described hereinabove, then a phase difference control layer 5 with a high resistance to thermal deterioration can be obtained within a short interval.

The protective film 6 is a layer to increase flatness, chemical resistance, heat resistance and resistance to ITO. The protective film 6 can be formed from a variety of photocurable resins, thermally curable resins, or two-pack curable resins such as acrylic resins, epoxy resins, and polyimides. The protective film 6 can be formed by a method selected according to the material thereof, e.g., by spin coating, printing, and photolithography. The thickness of the protective film 6 can be appropriately selected within a range of about 0.3 to 5.0 µm. This thickness is preferably selected within the range of about 0.5 to 3.0 µm to increase the strength of the protective film 6 and reduce the thickness of the entire color filter 1a.

Figure 2:
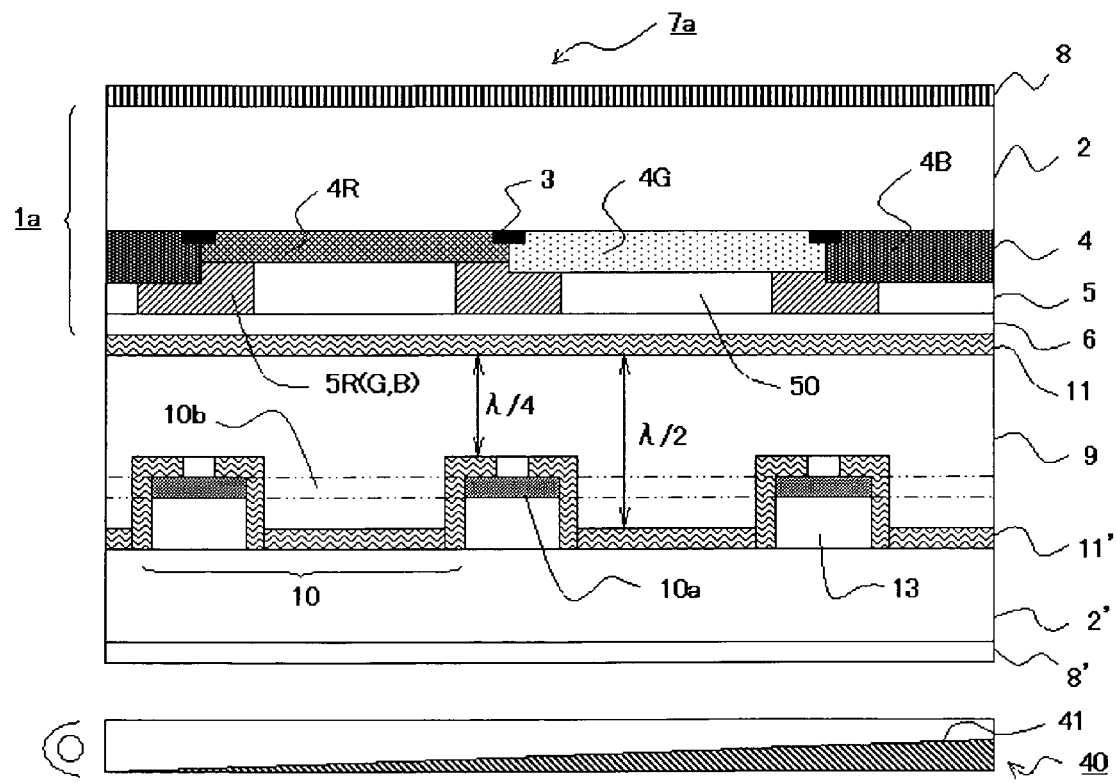
FIG. 2 is a cross-sectional schematic view illustrating an embodiment of the semi-transmissive semi-reflective liquid-crystal display device in accordance with the present invention that employs the color filter shown in FIG. 1.

FIG. 2 is a cross-sectional schematic view illustrating an embodiment of the semi-transmissive semi-reflective liquid-crystal display device in accordance with the present invention that used the color filter 1a shown in FIG. 1. The upper side of the figure is the viewing side of the liquid-crystal display. The liquid-crystal display device 7a has a structure in which the linear polarization plate 8 located on the upper side, upper substrate 2, color layer 4, phase difference control layer 5, protective film 6, liquid-crystal layer 9, semi-transmissive semi-reflective layer 10, lower substrate 2', and linear polarization plate 8' located on the lower side are laminated in the order of description from the viewing side. The structure consisting of four layers: upper substrate 2, color layer 4, phase difference control layer 5, and protective film 6 is equivalent to the color filter 1a shown in FIG. 1.

In the liquid-crystal display device shown in FIG. 2, the polarization plate 8 is bonded by an adhesive layer to the upper substrate 2. Transparent electrode layers 11, 11' are formed on the inner surfaces of the upper substrate 2 and lower substrate 2' that face each other. On the side of the upper substrate 2, the transparent electrode layer 11 is formed on the lower surface of the protective film 6, and on the side of the lower substrate 2', the transparent electrode layer 11' is directly formed on the upper surface of the lower substrate 2'.

The upper substrate 2 and lower substrate 2' hold the layers from the color layer 4 to the transparent electrode layer 11' and the circumferential edges thereof are sealed. The liquid-crystal layer 9 is formed in the sealed inner portion by injection of a liquid crystal. Orientation films (not shown in the figure) are formed on the inner surface sides of the transparent electrode layers 11 and 11' that face each other.

The case in which the phase difference control layer 5 has a function of a quarter-wavelength phase difference plate in the liquid-crystal display device 7a shown in FIG. 2 will be described below in greater detail.

The formation patterns of phase difference in the liquid crystal layer 9 can vary depending on the type of the liquid-crystal display device 7a, but it will be assumed that in the liquid crystal layer 9 of the present embodiment, a state is realized in which the phase shift between the incident light and transmitted light is zero when dark display is performed. More specifically, the phase difference can be realized by the following systems.

(i) A system in which when the liquid-crystal molecules are laid and oriented so that the optical axis is horizontal with respect to the liquid-crystal layer 9 and dark display is performed, a voltage is applied to the transparent electrode layers 11, 11' to cause vertical orientation of the molecules.

(ii) A system in which when the liquid-crystal molecules are raised and oriented so that the optical axis is perpendicular to the liquid-crystal layer 9 and dark display is performed, no voltage is applied to the transparent electrode layers 11, 11'.

In the present embodiment the aforementioned system (i) will be explained.

On the other hand, it is assumed that when bright display is performed in the liquid-crystal display device 7a, a predetermined phase difference is induced between the incident light and transmitted light in the liquid-crystal layer 9. The dark display and bright display can be advantageously realized by taking the phase difference amount at this time as a quarter of a wavelength ($\lambda/4$) in a reflective display region and as half a wavelength ($\lambda/2$) in a transmissive display region, as shown in FIG. 2. Therefore, a half-wavelength phase difference is obtained in the transmissive display region in the horizontal orientation state of liquid crystal molecules in any of the aforementioned systems (i) and (ii). Furthermore, as shown in the same figure, an insulating layer 13 is provided between the lower substrate 2' and a reflective plate 10a, and the thickness of the liquid-crystal layer 9 in the reflective display region is decreased by half with respect to that of the transmissive display region. As a result, when the liquid crystal macromolecule is oriented horizontally, a phase difference of half a wavelength or quarter of a wavelength, which is half that, is provided with respect to the transmitted light of the liquid-crystal layer 9 in the transmissive display region and reflective display region, respectively.

No specific limitation is placed on the material of the insulating layer 13, provided that it is an optically transmissive isotropic material. For example, a material identical to that of the protective layer 6, such as an alkyd resin, can be used. It is especially preferred that a photocurable resin be used.

An example of the method for forming the insulating layer 13 is described below. First, a photocurable resin is coated to a uniform thickness on the lower substrate 2', then a photomask that provides an open pattern only in the regions corresponding to the reflective plate 10a is placed on the coated resin layer, and ultraviolet exposure is performed. The zones of the resin layer that are located correspondingly to the open sections of the photomask are cured by photopolymerization and the zones of the resin layer that were shielded from the ultraviolet radiation by the mask do not undergo photopolymerization and are not cured. The insulating layer 13 can be obtained with a high resolution by removing the non-cured zones of the resin layer by etching. The coating thickness of the photocurable resin material is adjusted so that the sum of this thickness and the thickness of the reflective plate 10a at the time of photopolymerization curing is almost half the thickness of the transmissive display sections of the liquid-crystal layer 9.

When dark display is performed in the liquid-crystal display device 7a having the liquid-crystal layer 9, the transparent electrode layers 11, 11' apply a voltage to the liquid-crystal layer 9, and a state with a zero phase shift between the incident light and transmitted light is formed in the liquid-crystal layer 9. Furthermore, the transmission axis of the linear polarization plate 8 is taken to be perpendicular to the paper surface and the transmission axis of the linear polarization plate 8' is taken to be horizontal with respect to the paper surface.

The mixed light falling from above (in the figure) on the reflective display region becomes a linearly polarized light perpendicular to the paper surface when passing through the linear polarization plate 8. No phase shift occurs in the substrate 2 and color layer 4. In the phase difference control layer 5, a quarter-wavelength phase shift occurs in the phase difference pattern layers 5R, 5G, 5B and the linearly polarized light becomes a right rotation circularly polarized light. The circularly polarized light that passes without changes through the liquid crystal layer 9 is reflected by the reflective plate 10a and becomes a left rotation circularly polarized light. This reflected light passes through the liquid crystal layer 9 in the upper section of the figure, is provided with a quarter-wavelength phase shift by the phase difference pattern layers 5R, 5G, 5B and becomes a linearly polarized light horizontal with respect to the paper surface. Because the transmission axis of the linear polarization plate 8 is perpendicular to the paper surface, the reflected light is not transmitted through the linear polarization plate 8. As a result, dark display is performed in the reflective display region.

On the other hand, when the mixed light from the backlight 40 falls on the transmissive display region from the bottom upwards in the figure, first, when passing through the linear polarization plate 8', this light becomes a linearly polarized light horizontal with respect to the paper surface. No phase shift occurs in the transmitted light that passed through the liquid-crystal layer 9 even in the optically isotropic layer 50 of the phase difference control layer 5. As a result, this linearly polarized light reaches the linear polarization plate 8 without being changed. In this case, too, the linearly polarized light that is horizontal with respect to the paper surface is not transmitted through the linear polarization plate 8 and dark display is performed.

On the other hand, when bright display is performed, the transparent electrode layers 11, 11' do not apply voltage to the liquid-crystal layer 9. As a result, in the liquid-crystal layer 9, the incident light is provided with a quarter-wavelength phase difference and a half-wavelength phase difference in the incident reflective display region and transmissive display region, respectively.

The mixed light that falls on the reflective display region from above (as shown in the figure) becomes a linearly polarized light perpendicular to the paper surface when the light is transmitted through the linear polarization plate 8. No phase shift occurs in the substrate 2 and color layer 4. In the phase difference control layer 5, a quarter-wavelength phase shift occurs in the phase difference pattern layers 5R, 5G, 5B and the linearly polarized light becomes a right rotation circularly polarized light. The circularly polarized light is further shifted in phase by a quarter of a wavelength in the liquid-crystal layer 9 and becomes a linearly polarized light that is horizontal with respect to the paper surface. Since this linearly polarized light does not change the direction of polarization even when reflected by the reflective plate 10a, the reflected light is provided with a quarter-wavelength phase shift and becomes a right rotation circularly polarized light, while propagating upward through the liquid-crystal layer 9 as shown in the figure. This reflected light is further provided with a quarter-wavelength phase difference in the phase difference pattern layers 5R, 5G, 5B, becomes a linearly polarized light that is perpendicular to the paper surface and falls on the linear polarization plate 8. Because the transmission axis of the linear polarization plate 8 is perpendicular to the paper surface, this reflected light is transmitted through the linear polarization plate 8. As a result, bright display is performed in the reflective display region.

On the other hand, when the mixed light from the backlight 40 falls on the transmissive display region from the bottom upwards in the figure, first, when passing through the linear polarization plate 8', this light becomes a linearly polarized light horizontal with respect to the paper surface. Because a half-wavelength phase shift is provided in the liquid-crystal layer 9, the transmitted light becomes a linearly polarized light that is perpendicular to the paper surface and reaches the phase difference control layer 5. No phase shift occurs in the optically isotropic layer 50 of the phase difference control layer 5. As a result, this linearly polarized light is transmitted without any change through the linear polarization plate 8. Therefore, bright display is also performed in the transmissive display region.

When the mixed light from the backlight 40 falls on the reflective display region, it becomes a linearly polarized light that is horizontal with respect to the paper surface when transmitted through the linear polarization plate 8'. No phase shift occurs in the lower substrate 2' and insulating layer 13 and this linearly polarized light is mirror-surface reflected downward, as shown in the figure, at the rear surface of the reflective plate 10a. However, since the linearly polarized light does not change the direction of polarization even when reflected by the reflecting plate 10a, it passes downward through the linear polarization plate 8', while remaining the linearly polarized light that is horizontal with respect to the paper surface, and reaches the backlight reflective plate 41. In other words, the light emitted from the backlight 40 is reflected by the backlight reflecting plate 41 as linearly polarized light that is horizontal with respect to the paper surface and can be reused. Therefore, the backlight power can be saved. Because the reflected light has a predetermined angle of incidence upon the reflecting plate 10a and backlight reflecting plate 41 and reciprocates, it is repeatedly reused and, therefore, anyway falls on the transmissive display region.

As described hereinabove, the semi-transmissive semi-reflective liquid-crystal display device 7 employing the color filter 1a having the phase difference control layer 5 becomes a liquid-crystal display device of the so-called normally white type in which dark display is performed when a voltage is applied by the transparent electrode layers 11, 11', and bright display is performed when no voltage is applied, and a high contrast ratio can be obtained.

Figure 3:
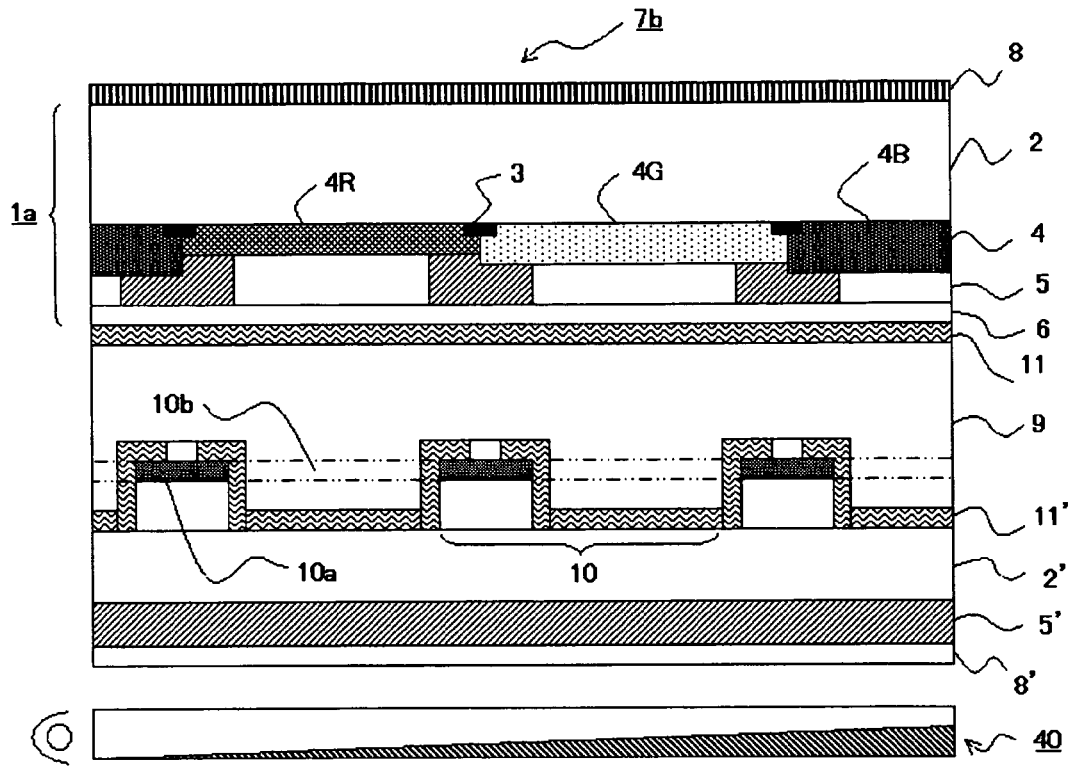
FIG. 3 is a cross-sectional schematic view illustrating another embodiment of the semi-transmissive semi-reflective liquid-crystal display device in accordance with the present invention.
Figure 4:
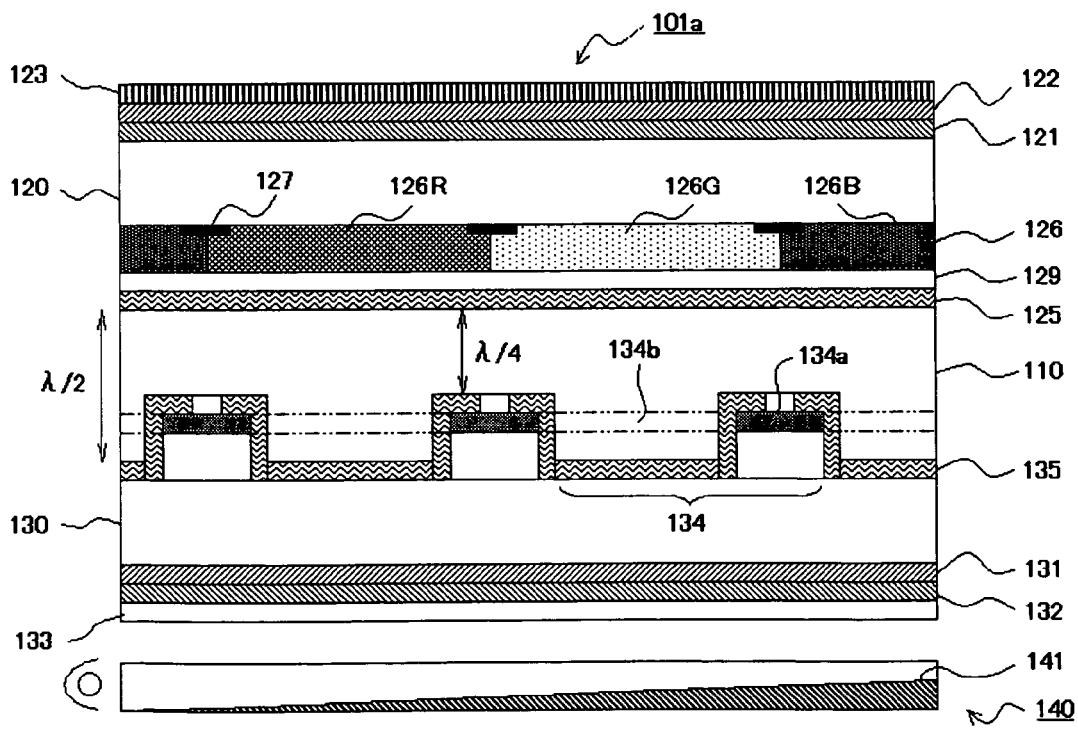
FIG. 4 is a cross-sectional schematic view illustrating the conventional semi-transmissive semi-reflective liquid-crystal display device having a phase difference plate outside a liquid-crystal cell.
Figure 5:
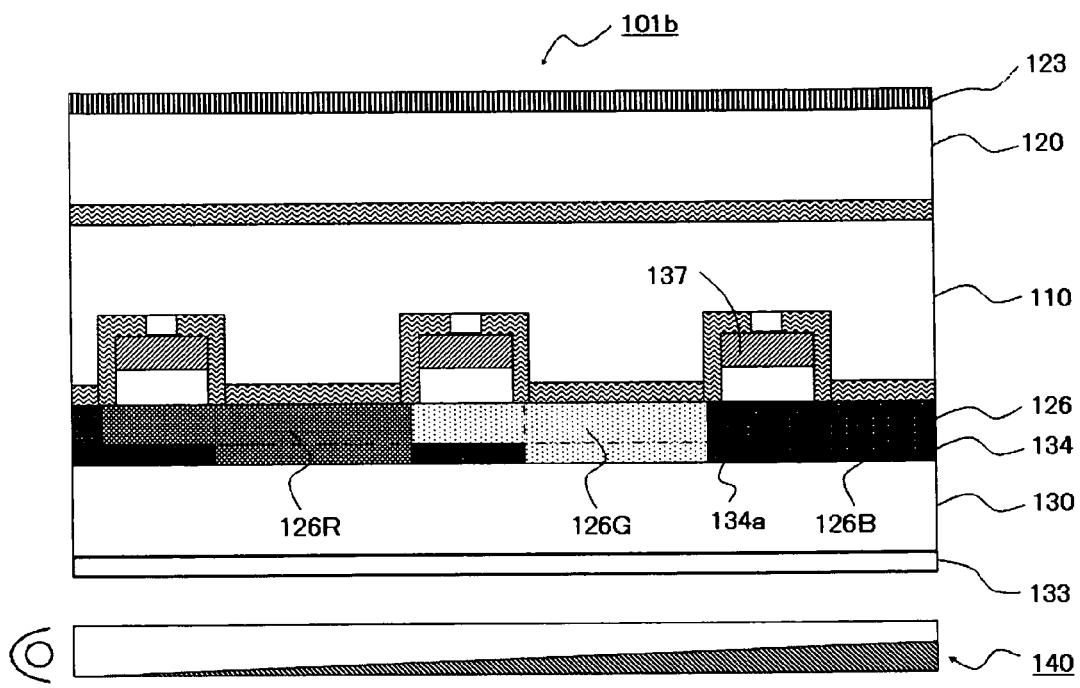
FIG. 5 is a cross-sectional schematic view illustrating the conventional semi-transmissive semi-reflective liquid-crystal display device in which a phase difference control layer is pattern formed in a reflective display region.
Figure 6:
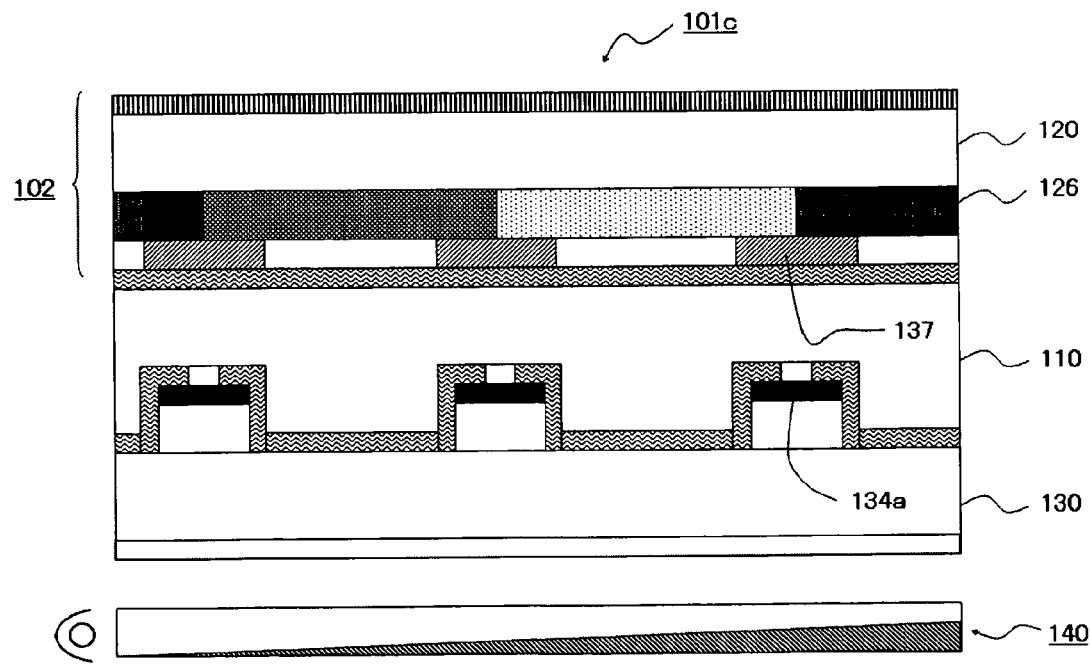
FIG. 6 is a cross-sectional schematic view illustrating the conventional semi-transmissive semi-reflective liquid-crystal display device using a color filter in which a phase difference control layer is pattern formed at an upper substrate.

FIG. 3 is a cross-sectional schematic drawing illustrating the configuration of the semi-transmissive semi-reflective liquid-crystal display device 7b in another embodiment of the present invention that uses the color filter 1a having the phase difference control layer shown in FIG. 1. The liquid-crystal display device 7b has a structure in which the linear polarization plate 8, upper substrate 2, color layer 4, phase difference control layer 5, liquid-crystal layer 9, lower substrate 2', another phase difference control layer 5', and linear polarization plate 8' are arranged in the order of description from the upper side of the figure (viewing side). The structure consisting of four layers selected from the above-described components, that is, the upper substrate 2, color layer 4, phase difference control layer 5, and protective film 6, is equivalent to the color filter 1a shown in FIG. 1.

In the liquid-crystal display device 7b, the second phase difference control layer 5' having a function, for example, of a negative C plate is provided on the outer surface side of the substrate 2'. Thus, the liquid-crystal display device 7b of the present embodiment is of a system such that the liquid-crystal molecules are raised and oriented in the liquid-crystal layer 9 so that the optical axis thereof becomes perpendicular to the liquid-crystal layer 9 and the application of voltage by the transparent electrode layers 11, 11' is realized only when bright display is performed.

The methods for forming the phase difference control layer 5' include a method of bonding a phase difference control plate that was formed separately to the substrate 2' via an adhesive layer and configuring this phase difference control plate as the phase difference control layer 5' and a method of coating a liquid crystalline polymer on the surface of the substrate 2', forming a thin film in which the liquid crystal molecules are oriented and configuring this thin film as the phase difference control layer 5'. The latter method is preferred because the entire liquid-crystal display device 7b can be reduced in thickness.

A layer demonstrating a uniform birefringence anisotropy over the entire structure, regardless of the color of the color pattern layers 4R, 4G, 4B can be employed for the phase difference control layer 5'.

A liquid-crystal display device of a perpendicular orientation mode with improved viewing angle can be obtained by providing, for example, the second phase difference control layer 5' with a function of the C plate in the liquid-crystal display device 7b shown in FIG. 3.

EXAMPLES

Example 1

(1) Configuration of Substrate and Color Layer

Photosensitive resin compositions (photoresists) for forming a black matrix and color pattern layers of the color layer that will be formed on the substrate was prepared. Each photoresist was prepared by mixing a dispersion and a resist composition. The dispersion was obtained by adding beads to a pigment, a dispersant and a solvent, using a paint shaker as a dispersing machine, dispersing for 3 h, and removing the beads. The resist composition comprises a polymer, a monomer, an additive, an initiator and a solvent. The composition of each photoresist is shown below. All the numbers are based on the weight standard. Photoresists for a total of six colors were prepared to configure the transmissive sections and reflective sections in RGB in order to match the spectral densities of the transmissive sections and reflective sections.

| (i) Photoresist for black matrix formation | |
|---|---|
| Black pigment (manufactured by Dainippon Seika Kogyo KK, TM Black #9550) | 14.0 parts |
| Dispersant (manufactured by BYK-Chemi Co., Disperbyk 111) | 1.2 part |
| Polymer (manufactured by Showa Polymer Co., Ltd., (meth)acrylic resin, product No. VR60) | 2.8 parts |
| Monomer (manufactured by Sartomer Co., Ltd., polyfunctional acrylate, product No. SR399) | 3.5 parts |
| Additive (dispersivity enhancer) (Soken Kagaku KK, Kemitri L-20) | 0.7 part |
| Initiator (2-benzyl-2-dimethylamino-1-(4-morpholinophenyl)-butanol-1) | 1.6 part |
| Initiator (4,4'-diethylaminobenzophenone) | 0.3 part |
| Initiator (2,4-diethylene thioxanthone) | 0.1 part |
| Solvent (ethylene glycol monobutyl ether) | 75.8 parts |
| (ii) Photoresist for forming a red color pattern layer | |
| Red pigment (C.I. PR254) (manufactured by Ciba Specialty Chemicals Co., Ltd., Chromophtal DPP Red BP) | 1.75 part |
| Yellow pigment (C.I. PY139) (manufactured by BASF Co., Paliotol Yellow D1819) | 0.3 part |
| Dispersant (manufactured by Zeneca Co., Ltd., Solsperse 24000) | 1.5 part |
| Polymer 1 (described below) | 5.0 parts |

| | |
|---|---|
| Monomer (manufactured by Sartomer Co., Ltd., polyfunctional acrylate, product No. SR399) | 4.0 parts |
| Initiator (manufactured by Ciba Specialty Chemicals Co., Ltd., Irgacure 907) | 1.4 part |
| Initiator (2,2'-bis(o-chlorophenyl)-4,5,4', 5'-tetraphenyl-1,2'-biimidazole) | 0.6 part |
| Solvent | 80.0 parts |

(Propylene Glycol Monomethyl Ether Acetate)

The Polymer 1 was obtained by adding 16.9 mol % 2-methacryloyl oxyethyl isocyanate to 100 mol % a copolymer of benzyl methacrylate:styrene:acrylic acid:2-hydroxyethyl methacrylate at 15.6:37.0:30.5:16.9 (molar ratio) and had a weight-average molecular weight of 42,500; same hereinbelow. The above-described composition was used for the reflective sections. The photoresist for the transmissive sections contained the red pigment, yellow pigment, and dispersant in twice as large amounts.

(iii) Photoresist for Forming a Green Color Pattern Layer

The following pigments were used in the below-described compounding quantities instead of the red pigment and yellow pigment in the photoresist for forming a red color pattern layer.

| | |
|---|---|
| Green pigment (C.I. PG7) (manufactured by Dainippon Seika KK, Seika Fast Green 5316P) | 1.9 part |
| Yellow pigment (C.I. PY139) | 1.1 part |

(manufactured by BASF Co., Paliotol Yellow D1819)

The above-described composition was used for the reflective sections. The photoresist for the transmissive sections contained the green pigment, yellow pigment, and dispersant in twice as large amounts.

(iv) Photoresist for Forming a Blue Color Pattern Layer

The following components were used in the below-described compounding quantities instead of the red pigment, yellow pigment, and dispersant in the photoresist for forming a red color pattern layer.

| | |
|---|---|
| Blue pigment (C.I. PB15:6) (manufactured by BASF Co., Heliogen Blue L6700F) | 2.3 parts |
| Violet pigment (C.I. PV23) (manufactured by Clariant Co., Ltd., Fast Perm RL-NF) | 0.7 part |
| Pigment derivative (manufactured by Zeneca Co., Ltd., Solsperse 12000) | 0.3 part |
| Dispersant (manufactured by Zeneca Co., Ltd., Solsperse 24000) | 1.2 part |

The above-described composition was used for the reflective sections. The photoresist for the transmissive sections contained all the components in twice as large amounts.

Melt-molded borosilicate thin-sheet glass with a thickness of 0.7 mm (manufactured by Corning Glass Co., Ltd., USA, Product No. 7059) was prepared for the substrate. After the substrate was washed, the photoresist for the black matrix formation was coated thereon by a spin coating process, and after the coating, the pre-baking was conducted for a heating time of 3 min at a temperature of 90° C. After the pre-baking, ultraviolet exposure was conducted at an irradiation dose of 100 mJ/cm$^2$ via a predetermined pattern, and after the exposure, spray development using a 0.05% KOH aqueous solution was performed for 60 sec. Then, post-baking was conducted for a heating time of 30 min at a temperature of 200° C., and a black matrix with a thickness of 1.2 µm that had open sections corresponding to pixels was formed.

A red color photoresist for reflective display was then coated by a spin coating method over the entire surface of the substrate where the black matrix has been formed, pre-baking was then conducted for a heating time of 3 min on a hot plate with a temperature of 80° C., and then only the red color reflective display portions were subjected to ultraviolet exposure via a predetermined pattern so as to obtain an irradiation dose of 200 mJ/cm$^2$, followed by spray development using the alkali of the same type. Then, post-baking was conducted for a heating time of 30 min at a temperature of 220° C. and a colored pattern layer with a thickness of 1.2 µm was formed on the sections corresponding to red color reflective pixels. Red pixels for transmission were formed on the transmissive sections by using the same procedure that was described hereinabove, except that the resist for the red color reflection was replaced with the resist for the red color transmission.

The green reflective sections, green color transmissive sections, blue color reflective sections, and blue color transmissive sections were configured by using the same procedure and varying the inks and photomasks respectively. The respective film thicknesses are presented below.

| | |
|---|---|
| Red color reflective sections | 1.07 µm |
| Red color transmissive sections | 1.10 µm |
| Green color reflective sections | 1.30 µm |
| Green color transmissive sections | 1.29 µm |
| Blue color reflective sections | 1.60 µm |
| Blue color transmissive sections | 1.61 µm |

(2) Configuration of Ink of the Phase Difference Control Layer

RMM34 (trade name, Merck Co.) was used as a polymerizable liquid-crystal material. A total of 25 parts by weight of the liquid-crystal material was mixed with 1 part by weight of 1-hydroxycyclohexyl phenyl ketone (Irgacure Irg 184: manufactured by Ciba Specialty Chemicals Co., Ltd.), and 74 parts by weight of toluene.

The liquid crystal phase transition temperature of the liquid-crystal material was about 60° C., and the isotropic phase transition temperature thereof was about 120° C.

(3) Configuration of the Patterned Phase Difference Layer

After the black matrix and color layer have been formed on the substrate, an ink composition of orientation film formation comprising a soluble polyimide resin (manufactured by JSR Co., Ltd., AL1254) was printed onto the required portions by a flexo printing method. The printing was followed by drying to remove the solvent. Then, baking was conducted for a heating time of 1 h at a temperature of 200° C. After the baking, the surface was rubbed to form an orientation film with a thickness of 700 Å. An ink for the phase difference control layer was then coated by a spin coating method. The substrate was then heated on a hot plate for a heating time of 5 min at a temperature of 100° C., the remaining solvent was removed, and a liquid crystal structure was developed. Then, ultraviolet irradiation (irradiation doze 10 J/cm$^2$, wavelength 365 nm) was conducted via a photomask and only the reflective display sections of each color were immobilized. The substrate was then heated for 40 min to attain a temperature of 200° C. at which the liquid crystal of the non-cured portions is an isotropic phase and a thermal polymerization reaction proceeds, and the liquid crystal layer was immobilized by thermal polymerization. The phase difference layer thus produced had good orientation characteristic. The phase difference amount for each color is presented below.

| Site: | Film thickness [μm]/ Phase difference [nm] |
|---|---|
| Red color (610 nm) reflective section: | 1.65/154 |
| Green color (550 nm) reflective section: | 1.46/136 |
| Blue color (450 nm) reflective section: | 1.21/113 |

A process for forming an orientation film of a liquid crystal for driving in the subsequent processing was assumed, an ink composition for forming an orientation film of a soluble polyimide resin type that was used for the prime orientation film of the phase difference layer was coated, and an overheating test was conducted for 1 h at a temperature of 220° C. The film thickness and phase difference were as follows and practically no changes were observed.

| Site: | Film thickness [μm]/ Phase difference [nm] |
|---|---|
| Red color (610 nm) reflective section: | 1.64/152 |
| Green color (550 nm) reflective section: | 1.46/134 |
| Blue color (450 nm) reflective section: | 1.21/112 |

This is apparently because the polymerization reaction advanced sufficiently in the baking process conducted for 40 min at a temperature of 200° C. and a crosslinking density sufficient for practical use was obtained.

At each RGB wavelength, the phase difference amount was about ¼ of the wavelength of the incident light and high-grade circular polarization was obtained over the entire visible light range.

Example 2

In Example 2, a sample was used that was configured in the same manner as in Example 1, except that heating after ultraviolet exposure was conducted at a temperature of 200° C. and exposure in this state was conducted for 10 min with ultraviolet radiation (irradiation dose 10 J/cm², wavelength 365 nm). The phase difference amount of the sample for each color is presented below.

| Site: | Film thickness [μm]/ Phase difference [nm] |
|---|---|
| Red color (610 nm) reflective section: | 1.62/155 |
| Green color (550 nm) reflective section: | 1.43/137 |
| Blue color (450 nm) reflective section: | 1.19/112 |

The sample of such configuration was subjected to an orientation film test under the same conditions as in Example 1. Both the film thickness and the phase difference almost maintained the initial values. The time necessary for curing was reduced apparently by additionally using ultraviolet radiation.

Comparative Example 1

In Comparative Examples 1, a sample was used that was configured in the same manner as in Example 1, except that after the formation of the phase difference pattern layer by ultraviolet exposure at a liquid crystal phase temperature, heating was conducted at a temperature of 160° C. to induce thermal curing of the non-polymerized isotropic portion. The phase difference amount of the sample for each color is presented below.

| Site: | Film thickness [μm]/ Phase difference [nm] |
|---|---|
| Red color (610 nm) reflective section: | 1.49/158 |
| Green color (550 nm) reflective section: | 1.33/139 |
| Blue color (450 nm) reflective section: | 1.11/115 |

The orientation film test was conducted under the same conditions as in Example 1. The film thickness and phase difference are presented below.

| Site: | Film thickness [μm]/ Phase difference [nm] |
|---|---|
| Red color (610 nm) reflective section: | 1.45/125 |
| Green color (550 nm) reflective section: | 1.30/112 |
| Blue color (450 nm) reflective section: | 1.06/94 |

The phase difference value decreased to about 80% that prior to the test. This is apparently because the reaction did not proceed sufficiently during thermal curing and the crosslinking density was insufficient.

Comparative Example 2

In Comparative Examples 2, a sample was used that was configured in the same manner as in Example 1, except that heating after ultraviolet exposure was conducted at a temperature of 270° C. and the isotropic phase portions were thermally cured. The phase difference amount of the sample for each color is presented below.

| Site: | Film thickness [μm]/ Phase difference [nm] |
|---|---|
| Red color (610 nm) reflective section: | 1.70/54 |
| Green color (550 nm) reflective section: | 1.51/43 |
| Blue color (450 nm) reflective section: | 1.23/34 |

The phase difference amount per film thickness in Comparative Example 2 decreased significantly with respect to that of Example 1. This is apparently because thermal perturbations have occurred in the liquid-crystal molecules after the crosslinking due to heating to a temperature of 270° C. during backing, the degree of orientation order was reduced and the refractive index anisotropy was decreased. In the case where the heating-induced decrease of phase difference is large, the phase difference amount is difficult to control, the material itself is yellowed, and optical characteristic thereof are greatly degraded.

What is claimed is:
1. A color filter comprising:
    a substrate having light transmissivity;
    a color layer provided on a lower surface of the substrate and comprising a plurality of color pattern layers each transmitting visible light of a different color; and a phase difference control layer comprising a plurality of phase difference pattern layers which are optically anisotropic and an optically isotropic layer in which a phase difference amount is substantially zero, the phase difference control layer being provided on a lower surface of the color layer, a plurality of color differentiation regions, one for each of the different colors of the color layer, each color differentiation region comprising one of the plurality of the color pattern layers, the phase difference pattern layers and the optically isotropic layer provided on a lower surface of the color pattern layer, wherein:

the phase difference control layer is configured by polymerizing and immobilizing an oriented liquid crystalline compound, a thickness of the phase difference pattern layer, a thickness of the optically isotropic layer, and a thickness of the color pattern layer are different for each of the color differentiation regions, a sum value of the thickness of the color pattern layer and the thickness of the phase difference pattern layer is constant in each color differentiation region, a first phase difference pattern layer having a phase difference provided on a lower surface of a first color pattern layer of the plurality of the color pattern layers and a second phase difference pattern layer having a phase difference provided on a lower surface of a second color pattern layer of the plurality of the color pattern layers are formed adjacent and continuous to each other in adjacent color pattern layers, and a protective film that increases flatness, chemical resistance, heat resistance and resistance to ITO is provided on a lower surface of the phase difference control layer.

2. The color filter according to claim 1, wherein the phase difference control layer is provided on the lower surface of the color layer via an orientation film.

3. The color filter according to claim 1, wherein the phase difference pattern layer is formed by an ultraviolet-polymerizable thermotropic liquid crystal material.

4. The color filter according to claim 1, wherein the optically isotropic layer is formed by an optically isotropic liquid crystal material.

5. A semi-transmissive semi-reflective liquid-crystal display device comprising:
the color filter according to claim 1;
a substrate provided below the color filter;
a liquid-crystal layer provided between the color filter and the substrate; and
a reflective display region provided in the location facing a phase difference pattern layer in the color filter,
wherein a reflective display region comprises a reflective plate and an insulating layer made from an optically transmissive isotropic material provided between the reflective plate and the substrate.

6. The semi-transmissive semi-reflective liquid-crystal display device according to claim 5, wherein another phase difference control layer which is different from the phase difference control layer in the color filter is provided on an outer surface side of the substrate.

7. The semi-transmissive semi-reflective liquid-crystal display device according to claim 6, wherein the another phase difference control layer provided on the outer surface side of the substrate has an optical axis perpendicular to the phase difference control layer and a negative birefringence anisotropy.

8. The semi-transmissive semi-reflective liquid-crystal display device according to claim 6, wherein the phase difference control layer in the color filter has an optical axis that is horizontal with respect to a layer surface of the phase difference control layer and a positive birefringence anisotropy, and the another phase difference control layer provided on the outer surface side of the substrate has an optical axis perpendicular to the phase difference control layer and a negative birefringence anisotropy.

9. The semi-transmissive semi-reflective liquid-crystal display device according to claim 5, wherein a phase difference amount in a reflective display region is a quarter of a wavelength ($\lambda/4$), and a phase difference amount in a transmissive display region is half a wavelength ($\lambda/2$).

10. The color filter according to claim 1, wherein the optically isotropic layer comprises liquid crystalline compound that is thermally polymerized at a temperature equal to or higher than an isotropic phase transition temperature.

11. The color filter according to claim 1, wherein the phase difference control layer has an optical axis that is horizontal with respect to a layer surface of the phase difference control layer and a positive birefringence anisotropy.

12. The color filter according to claim 1, wherein the protective film is formed from photocurable resins, thermally curable resins, or two-pack curable resins.

13. The color filter according to claim 1, wherein the protective film is formed from acrylic resins, epoxy resins, or polyimides.

14. The color filter according to claim 1, wherein the protective film is a film which is formed by spin coating, printing or photolithography.

15. The color filter according to claim 1, wherein the protective film has a film thickness of 0.3 to 5.0 μm.

16. The color filter according to claim 1, wherein the first color pattern layer is a red color pattern layer in the plurality of color pattern layers, the second color pattern layer is a green color pattern layer in the plurality of color pattern layers, and a third color pattern layer in the plurality of color pattern layers is provided adjacent to the second color pattern layer, wherein the third color pattern layer is a blue color pattern layer.

17. The color filter according to claim 16, wherein the first phase difference phase difference pattern layer is provided on a lower surface of the red color pattern layer, the second phase difference pattern layer is provided on a lower surface of the green color pattern layer and a third phase difference pattern layer is provided adjacent to the second phase difference pattern layer and is provided on a lower surface of the blue color pattern layer, and
wherein the first phase difference pattern layer, the second phase difference pattern layer and the third phase difference pattern layer are formed adjacent and continuous to one another.

18. A method for manufacturing a color filter, comprising the steps of:
forming a plurality of color pattern layers each transmitting visible light of a different color on an upper surface of a substrate having light transmissivity, so that the color pattern layers have different thicknesses;
forming a layer of a polymerizable liquid-crystal composition comprising an ultraviolet polymerizable liquid crystalline compound on an upper surface of a color layer comprising a plurality of the color pattern layers, so that a sum value of a thickness of the color layer and a thickness of the polymerizable liquid crystal composition is constant in each color pattern layer;

causing an orientation of the liquid crystalline compound at a liquid crystal phase temperature;

providing a photomask patterned according to a predetermined pattern on an upper surface of the layer of the polymerizable liquid crystal composition;

forming phase difference pattern layers that have a phase difference by polymerizing and immobilizing said oriented liquid crystalline compound by an ultraviolet exposure via the photomask at the liquid crystal phase temperature;

forming one of the phase difference pattern layers having a phase difference on a lower surface of one of the color pattern layers and one of the phase difference pattern layers having a phase difference on a lower surface of another of the color pattern layers adjacent and continuous to each other in an adjacent color pattern layer at the formation of the phase difference pattern layer;

removing the photomask;

thermally polymerizing and immobilizing the liquid crystalline compound that is not polymerized by the ultraviolet exposure at the liquid crystal phase temperature by heating the liquid crystalline compound to a temperature at which a thermal polymerization reaction proceeds and which is a temperature equal to or higher than an isotropic phase transition temperature to form an optically isotropic layer; and forming a protective film on an upper surface of the phase difference pattern layer by a method of spin coating, printing or photolithography, the protective film providing increased flatness, chemical resistance, heat resistance and resistance to ITO.

* * * * *